United States Patent [19]

Morita et al.

[11] Patent Number: 5,793,340
[45] Date of Patent: Aug. 11, 1998

[54] IMAGE CORRECTION APPARATUS

[75] Inventors: Takehiko Morita; Akira Hitotsumatsu; Kouji Minami; Yoshiki Ono, all of Nagaokakyo, Japan

[73] Assignee: Mitsubishi Denki Kabushiki Kaisha, Tokyo, Japan

[21] Appl. No.: 528,975

[22] Filed: Sep. 15, 1995

[30] Foreign Application Priority Data

Sep. 19, 1994 [JP] Japan ................... 6-223344

[51] Int. Cl.⁶ ...................................... G09G 5/00
[52] U.S. Cl. ............................... 345/7; 348/806
[58] Field of Search ................. 345/7, 8, 9, 10, 345/11, 12, 13; 348/806, 807; 315/368.12, 368.13; 353/69

[56] References Cited

U.S. PATENT DOCUMENTS 5,506,481  4/1996  Wada et al. ............... 348/806

FOREIGN PATENT DOCUMENTS 61-93789   5/1986   Japan.
3-38797    6/1991   Japan.
5-328370   12/1993  Japan.

Primary Examiner—Regina Liang

[57] ABSTRACT

An adjustment reference point is defined as a point on a screen on which a corresponding adjustment point of an image is projected when the image projected by a CRT system video projector is assumed to have no raster distortion. An image correction apparatus of this invention produces a raster distortion correction data on the basis of a difference between the adjustment reference point and the corresponding adjustment point obtained from a video signal. The video signal is obtained by picking up an predetermined image including an adjustment reference point projected on the screen by using a camera device.

28 Claims, 23 Drawing Sheets

FIG. 12A
FIG. 12B
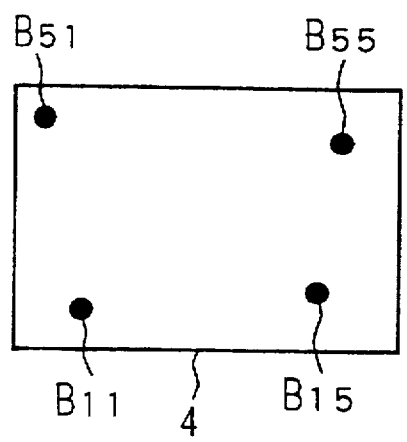
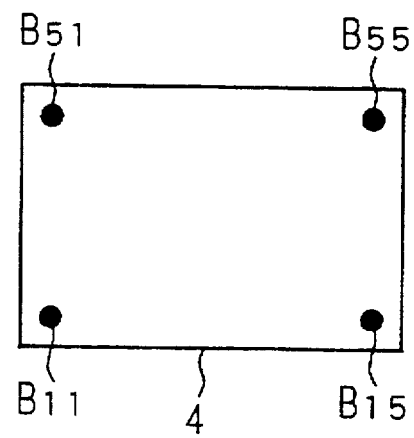
BEFORE ADJUSMENT
AFTER ADJUSMENT

BINARIZING
PROCESSING

LABELING

DETECTING
PROPOSED AREA

EXTRACTED
PROPOSED AREA

IMAGE CORRECTION APPARATUS

BACKGROUND OF THE INVENTION

1. Field of the Invention

The present invention relates to an image correction apparatus to be used together with a CRT system video projector, capable of correcting raster distortion and adjusting convergence in an image projected by the projector.

2. Description of Related Art

FIG. 1 is a block diagram showing a configuration of a conventional convergence adjustment apparatus disclosed in Japanese Patent Publication No. 3-38797 (1991). In the apparatus of FIG. 1, an image is projected on a screen 4 by a projection cathode-ray tube 120. This convergence adjustment apparatus comprises a video unit 2, a camera unit 126 and an input unit 131. The video unit 2 comprises the projection cathode-ray tube 120, a projection lens 121 disposed on the side of the projection cathode-ray tube 120 nearer to the screen 4, a deflection yoke 122, a convergence yoke 123, a driving circuit 125 for driving the deflection yoke 122, a digital convergence unit 124, a dot generator 106, a video circuit 107 and an output amplifier 116.

The camera unit 126 comprises a camera 8, a moving unit 128 for moving the head of the camera 8, a position detecting unit 129 for detecting the position of the camera head and a digital memory device 130. The moving unit 128 directs the camera 8 toward an optional point on the screen 4, and the position detecting unit 129 detects which point on the screen the camera 8 is directed to based on the angle of the camera 8. The digital memory device 130 controls the moving unit 128 and stores the detection result obtained by the position detecting unit 129. The position of a point on the screen 4 on which convergence is adjusted (i.e., a convergence adjustment point) is selected under an instruction of the input unit 131.

When the convergence adjustment is performed by using this convergence adjustment apparatus having such a configuration as mentioned above, a dot pattern generated by the dot generator 106 is inputted to the video circuit 107. The convergence adjustment point is instructed by the input unit 131. The digital memory device 130 in the camera unit 126 converts the inputted instruction into a data for controlling the moving unit 128, thereby directing the camera 8 in the direction for picking up an image on the instructed convergence adjustment point. At this point, the camera 8 picks up a part of the image on the screen in a magnification manner. This is because the obtained dot image is expanded due to the expansion of electron beams and blur in an optical system and resolution is required to be sufficiently high to detect the shape of the expanded image.

A color signal switching unit in the digital convergence unit 124 allows the dot generator 106 to generate a green signal alone. The video circuit 107 performs image processing on the green signal, so that the projection cathode-ray tube 120 projects a dot image corresponding to the green signal on the screen 4. The camera 8 picks up a convergence adjustment point on this green dot image, and outputs the obtained video signal to the digital convergence unit 124. The digital convergence unit 124 obtains the horizontal and vertical positions of the convergence adjustment point of the green signal. Next, the color signal switching unit allows the dot generator 106 to generate a red signal alone, and the digital convergence unit 124 similarly obtains the horizontal and vertical positions of the convergence adjustment point of the red signal. The digital convergence unit 124 compares the values corresponding to the positions relates to these signals, and increases or decreases convergence adjustment data stored on a frame memory therein in accordance with the values. The convergence adjustment data are D/A converted to be used to drive a convergence coil in the convergence yoke 122 through the output amplifier 116. When the convergence coil is driven in this manner, the position of the dot pattern of the red signal is moved. The positions of the dot patterns of the green signal and the red signal can accord with each other by repeating the detection, comparison and data increase/decrease as described above. The same procedure is repeated with regard to the dot patterns of a green signal and a blue signal. Thus, the convergence is automatically adjusted by instructing the positions of the convergence adjustment points.

The conventional convergence adjustment apparatus is thus constructed, and hence, the positions of the convergence adjustment points should be manually instructed. This disadvantageously requires a large effort and a longer time for the adjustment. Furthermore, in the installation adjustment of a CRT projector, image distortion caused by the projection is inevitably corrected priorly to the convergence adjustment. The image distortion caused by such a projection is designated as raster distortion. The aforementioned apparatus can adjust the convergence but cannot correct the raster distortion. Since the raster distortion can be corrected by supplying a raster distortion correcting signal to the convergence yoke related to a green signal, it is ideal that the correction of the raster distortion and the adjustment of the convergence are automatically performed with a single system.

SUMMARY OF THE INVENTION

The present invention has been devised to overcome the aforementioned problems. One object of the invention is to provide an image correction apparatus capable of raster distortion correction. Another object of the invention is to provide an image correction apparatus capable of convergence adjustment by using a system for the raster distortion correction.

The image correction apparatus of the invention comprises camera means for picking up a screen, pick-up position moving means for moving a pick-up position of the camera means, movement controlling means for controlling drive of the pick-up position moving means, instructing means for giving an instruction to the movement controlling means, first memory means for storing, the pick-up positions at which predetermined points on the screen are picked up in a predetermined area of a picture frame included in the camera means, first calculating means for calculating the positions of a predetermined number of adjustment reference points on the screen by using the content of the first memory means, analog/digital converting means (A/D converting means) for converting a video signal picked up by the camera means into a digital video data, second memory means for storing the video data converted by the A/D converting means, second calculating means for obtaining differences between the positions of the adjustment reference points and the positions of corresponding adjustment points on a predetermined image projected on the screen, and third calculating means for calculating an image distortion correction data based on the differences, and interface means for supplying the image distortion correction data to the CRT projector. The instructing means gives an instruction to the movement controlling means on the basis of the result obtained by the first calculating means.

Therefore, the adjustment reference points corresponding to m×n adjustment points provided on the screen, namely, the points on which the adjustment points on an image projected by the CRT projector are projected on the screen when the image has no raster distortion, are indicated by pick-up positions of the camera means. The raster distortion can be corrected by obtaining a difference between each position of the adjustment reference point and each position of the adjustment points on the projected image. The raster distortion is obtained based on the differences obtained when a single-color test signal of green (G) is projected on the screen by the CRT projector, and an extent of the raster distortion is similarly obtained with regard to all the m×n adjustment points.

Alternatively, the image correction apparatus of the invention further comprises input means for inputting the content of the instruction to the instructing means and a monitor for displaying a video signal picked up by the camera means. The first memory means stores pick-up positions at which screen corners are respectively picked up, and the pick-up positions of the screen corners are determined by using the monitor and the input means.

Therefore, while monitoring the picked up image by the camera means, the pick-up positions at which the screen corners, for example four, are picked up are inputted by the input means such as a keyboard. By using the pick-up positions, the positions of all the adjustment reference points are calculated.

Alternatively, the image correction apparatus of the invention further comprises input means for inputting the content of the instruction to the instructing means. The first memory means stores pick-up positions at which points among the adjustment points on the predetermined image projected on the screen by the CRT projector are picked up. The points are adjusted to be positioned at the corners of a rectangular by the input means, and the pick-up positions of the points are determined by using the video data of the predetermined image stored in the second memory means.

Therefore, among the adjustment points of an adjustment pattern projected on the screen, the adjustment points, for example four, are selected so as to be the four corners of a rectangular by the input means. Thus, there is no need to use a monitor to input such information.

Alternatively, the image correction apparatus of the invention further comprises decision means for deciding whether or not the camera means picks up a screen corner by using the video data stored in the second memory means. The first memory means stores pick-up position at which the screen corners are picked up, and the pick-up positions of the screen corners are determined by using the video data stored in the first memory means when the decision means decides that a screen corner is picked up.

Therefore, the positions of the corners, for example four, of the screen are detected without any instruction by an operator, and reference positions of all the m×n adjustment points are calculated based on the detected positions of the four screen corners.

In one aspect of the image correction apparatus of the invention, the second calculating means includes fourth calculating means for calculating the positions of adjustment points on the predetermined image projected on the screen.

In another aspect, the image correction apparatus of the invention further comprises fifth calculating means for obtaining second differences between the predetermined positions of adjustment points of the image projected in one color and the positions of corresponding adjustment points of the same image projected in another color, by using a result of the calculation by the fourth calculating means, and sixth calculating means for calculating a convergence adjustment data based on the second differences and inputting the data to the interface means.

Therefore, a single-color test signal of red (R) or blue (B) projected by the CRT projector on the screen is picked up by the camera means in a magnification manner, the picked up video signal is subjected to image processing, and an extent of convergence displacement of one adjustment point is obtained based on a difference from a projected position of a G test signal. This procedure is repeated with regard to each of the m×n adjustment points so as to obtain the extents of the convergence displacement related to all the adjustment points. Then, the convergence is adjusted by controlling the CRT projector so as to eliminate the convergence displacement.

In still another aspect of the image correction apparatus of the invention, the decision means extracts a proposed area from the video data stored in the second memory means, removes an area smaller than a predetermined length, and then detects a screen corner. Therefore, even when the shape of a screen corner is deformed in the video data due to the irradiation angle of light irradiating the screen, the screen corners, for example four, can be accurately detected by removing minor lines.

In still another aspect of the image correction apparatus of the invention, the decision means extracts a proposed area from the video data stored in the second memory means so as to divide the proposed area into lines, and detects a screen corner when the number of the lines is even and there are an even number of pairs of the lines adjacent to each other at an angle of approximately 180 degrees. Therefore, even when a corner area and another area at the edge of the screen are communicated with each other due to the positional relationship between lighting equipment and the screen, the screen corners, for example four, can be accurately detected.

The above and further objects and features of the invention will more fully be apparent from the following detailed description with accompanying drawings.

BRIEF DESCRIPTION OF THE DRAWINGS

FIG. 12 is an explanatory view showing a screen before and after adjusting positions of four corner adjustment points in Embodiment 2;

DESCRIPTION OF THE PREFERRED EMBODIMENTS

The present invention will now be described referring to the accompanying drawings illustrating the embodiments thereof.

Figure 1:
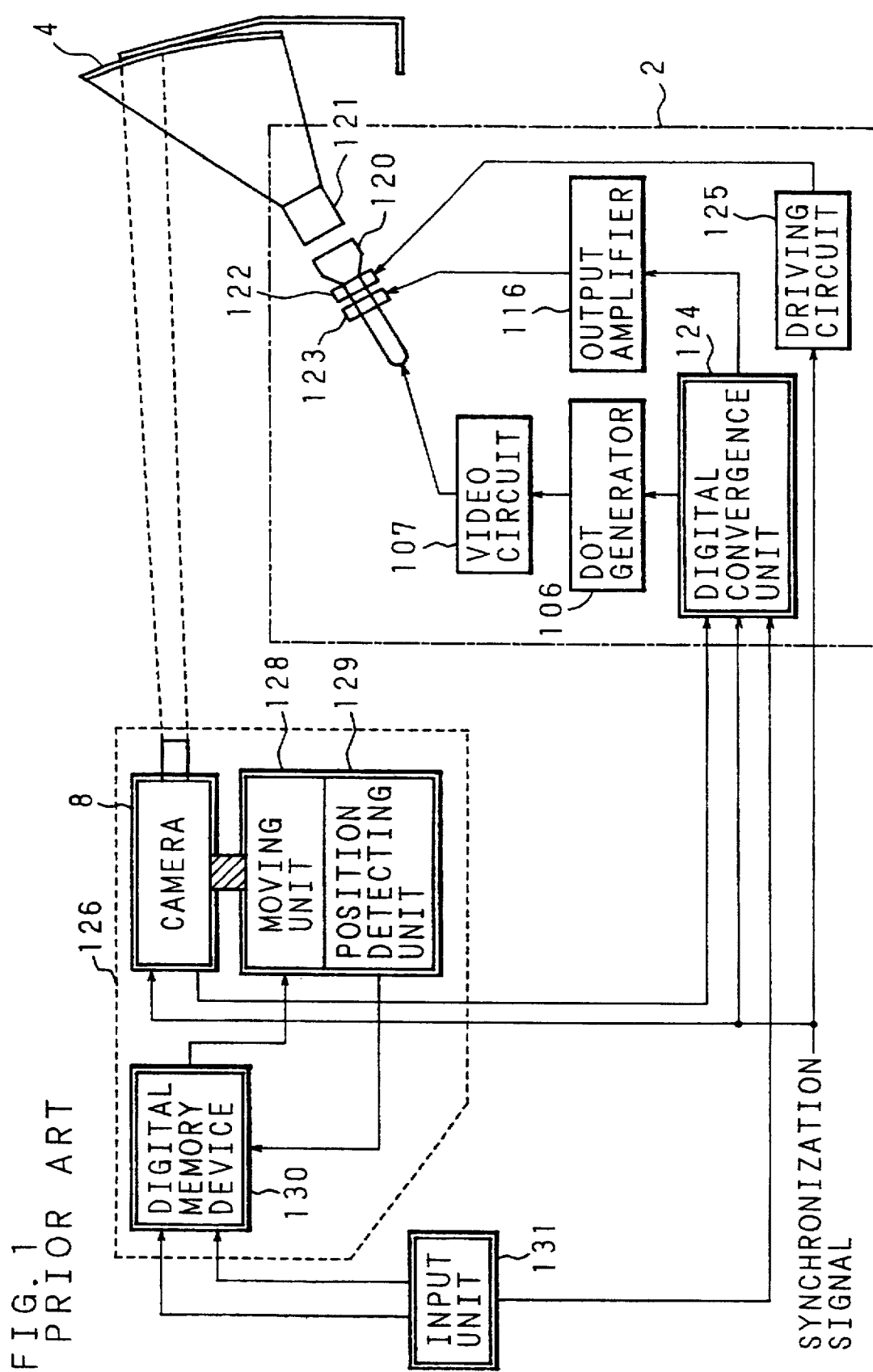
FIG. 1 is a block diagram showing a configuration of a conventional convergence adjustment apparatus.
Figure 2:
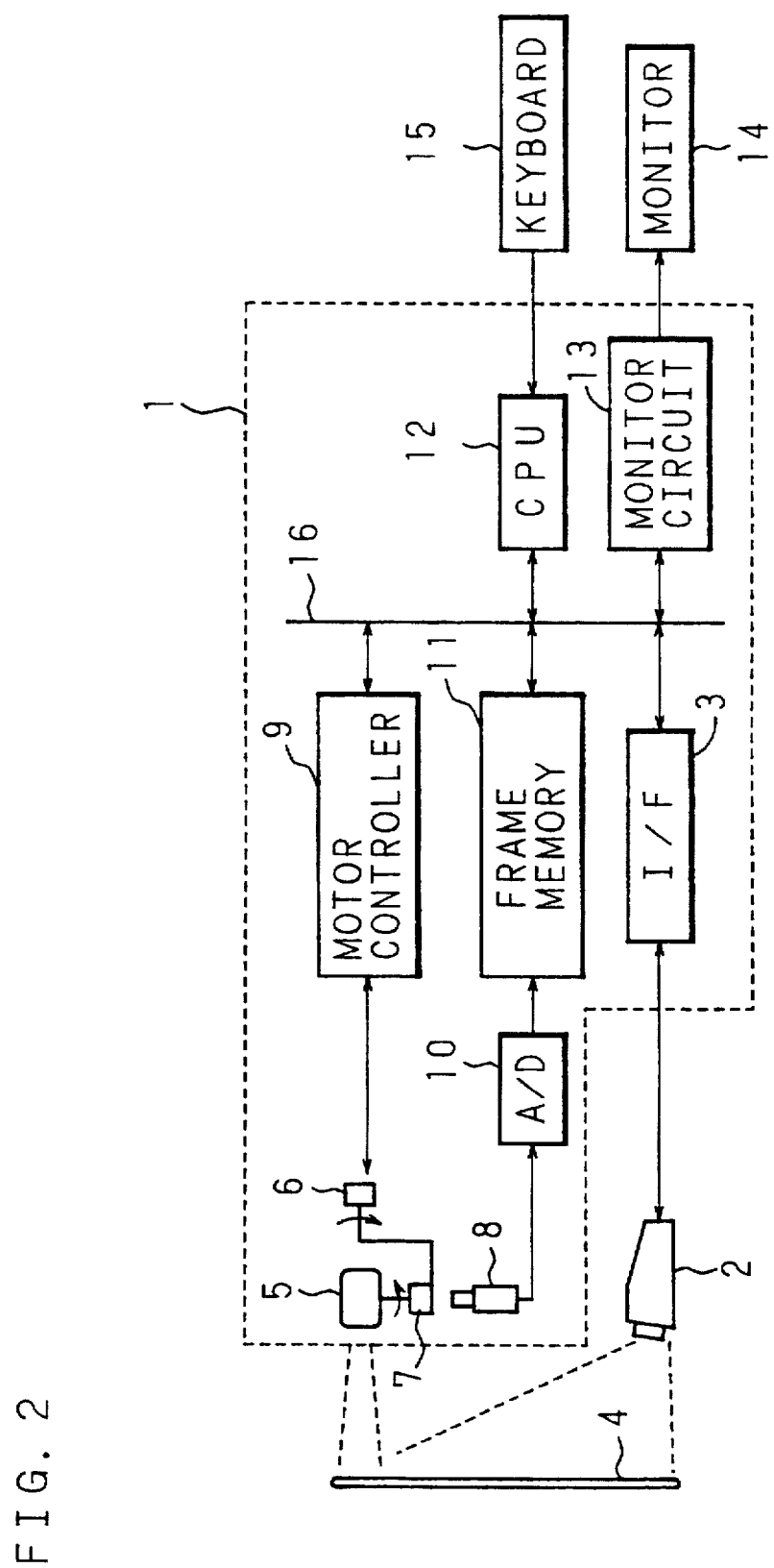
FIG. 2 is a block diagram showing a configuration of an image correction apparatus according to Embodiment 1 of the invention.

Embodiment 1:

FIG. 2 is a block diagram showing the configuration of an image correction apparatus according to Embodiment 1 of the invention. As is shown in FIG. 2, an image correction apparatus 1 supplies an image correction data to a CRT system video projector (hereinafter referred to as the CRT projector) 2, so as to control convergence currents flowing through convergence yokes respectively for red, green and blue signals (hereinafter referred to as R, G and B signals, respectively) in the CRT projector, thereby adjusting distortion and convergence of an image. The image correction data is transferred to the CRT projector 2 by an interface circuit 3 possessed by the image correction apparatus 1. A screen 4 is disposed at a position where a projection image is projected by the CRT projector 2.

The image correction apparatus 1 has the following configuration: A mirror 5 is disposed so as to oppose the screen 4. The mirror 5 has two movable axes and is used to pick up part of the screen 4 by a camera 8 as described in detail below. The movable axes of the mirror 5 are respectively provided with mirror rotating devices such as stepping motors 6 and 7. The stepping motors 6 and 7 are driven under control of a motor controller 9. The camera 8 is disposed so as to oppose the mirror 5, and picks up part of the screen 4 in a magnification manner through the mirror 5. By changing the angle of the mirror 5 against the screen 4, the covering range of the camera 8 on the screen 4 (i.e., a pick-up position of the camera 8) can be moved. A video signal picked up by the camera 8 is inputted to an A/D converter 10 so as to be converted into a digital video data. The video data obtained through the digital conversion by the A/D converter 10 is stored on a frame memory 11. A CPU 12 includes a work memory therein. A monitor circuit 13 converts an output data from the CPU 12 and the video data on the frame memory into a video signal. The CPU 12, the interface circuit 3, the motor controller 9, the frame memory 11 and the monitor circuit 13 are connected one another through a bus 16. The image correction apparatus 1 receives an input through a keyboard 15. The video signal obtained by the monitor circuit 13 is displayed on a monitor 14.

Figure 3:
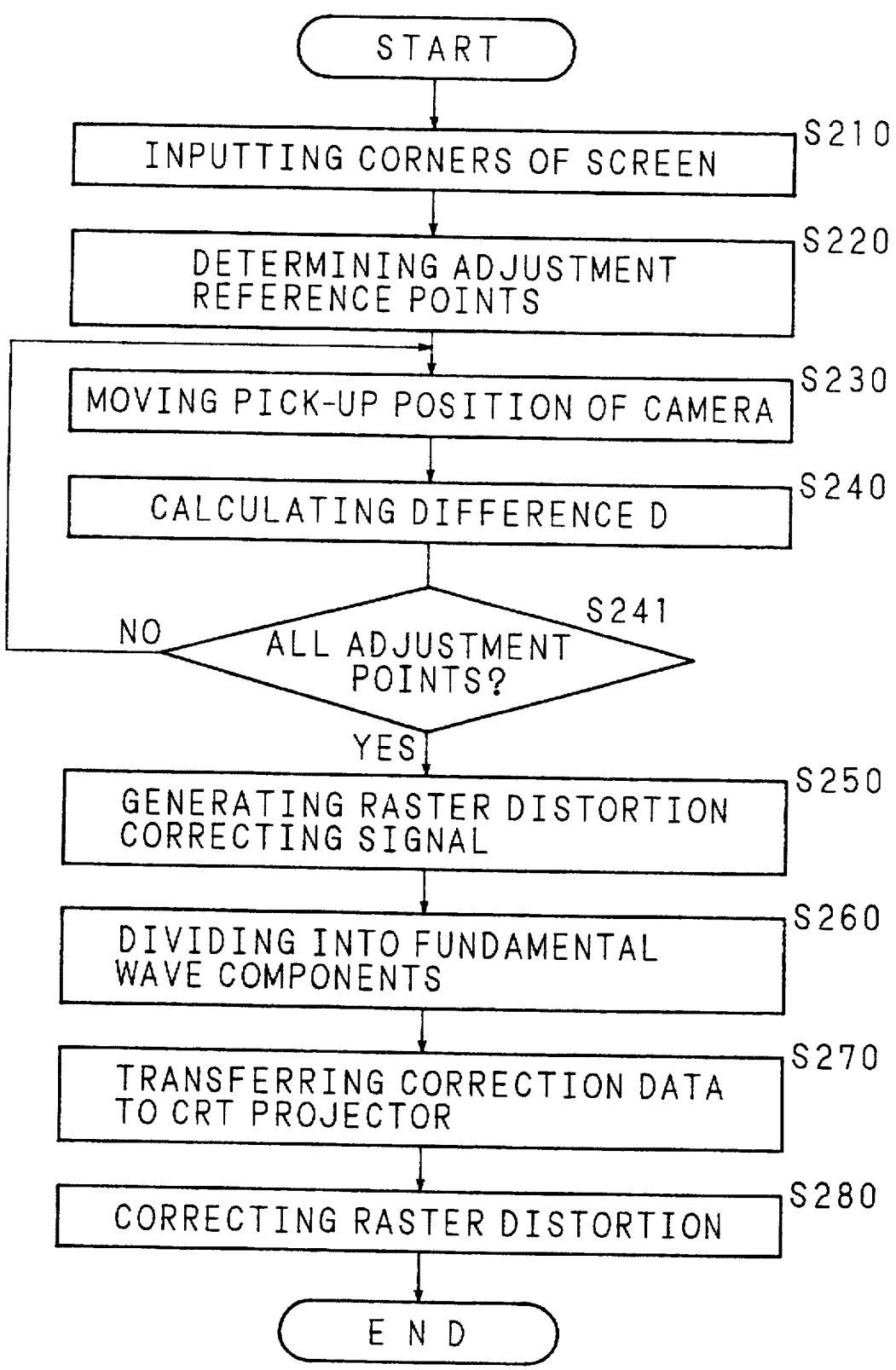
FIG. 3 is a flowchart for the procedures in raster distortion correction of Embodiment 1.

The procedures in raster distortion correction by this image correction apparatus 1 will now be described referring to FIG. 3. The outline of the procedures will be described, and the detailed description of the procedures will be given afterward. The positions of four corners of the screen are inputted through the keyboard 15 (step S210). The coordinates of adjustment reference points corresponding to all of predetermined adjustment points are determined based on the positions of the four corners of the screen by using expressions described below (step S220). An adjustment reference point herein indicates a point on the screen 4 on which an adjustment point on an image is to be projected when the image has no raster distortion. The pick-up position of the camera 8 is moved so that one of the adjustment reference points is positioned at the center of the coordinate on the frame memory 11 (step S230). An adjustment pattern projected on the screen 4 by the CRT projector 2 is picked up by the camera 8, thereby calculating the coordinates on the frame memory 11 of the adjustment point in the adjustment pattern. Then, a difference D between each of the calculated coordinates and the coordinates of the corresponding adjustment reference points obtained in step S220. It is determined whether or not a difference D has been calculated with regard to all of the adjustment points (step S241), and these procedures (from step S230 to step S240) are repeated until the differences D related to all of the adjustment points are calculated. Based on the differences D of all of the adjustment points (=the raster distortion), a raster distortion correcting signal is generated (step S250), and this correcting signal is divided into fundamental wave components (step S260). The coefficients of the respective fundamental wave components are transferred as the correction data through the interface circuit 3 to the CRT projector 2 (step S270). The CRT projector 2 corrects the raster distortion by using the received correction data (step S280).

Figure 4:
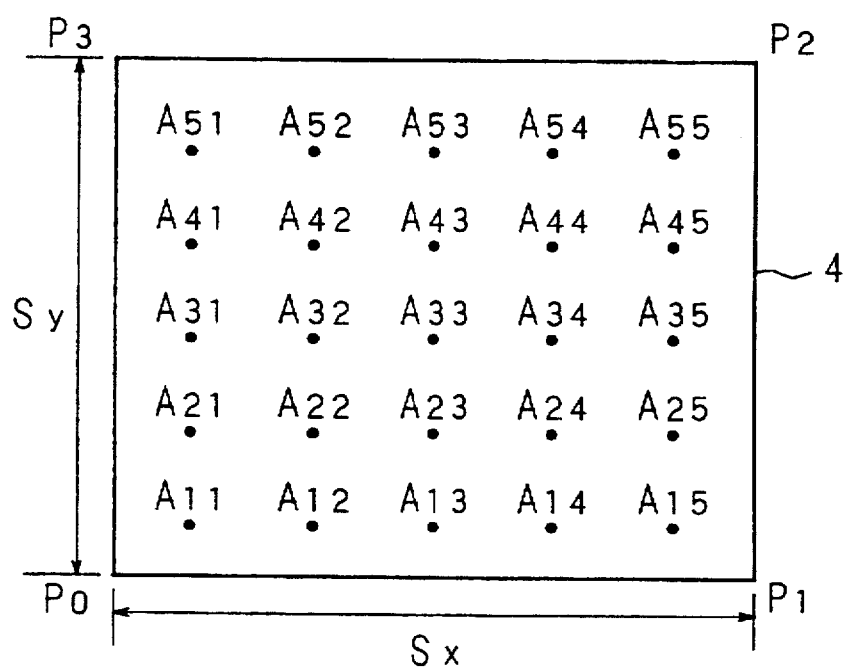
FIG. 4 is an explanatory view showing adjustment reference points in Embodiment 1.

The detailed procedures in the raster distortion correction are as follows: The raster distortion correction is conducted in order to obtain a rectangular raster with no distortion of a projected image of a G signal in a predetermined aspect ratio. This can be attained by allowing adjustment points of, for example, 5 points in the vertical direction and 5 points in the horizontal direction (5×5), in a projected image to accord with corresponding adjustment reference points. FIG. 4 is an explanatory view showing the adjustment reference points in this embodiment, wherein $P_0$, $P_1$, $P_2$ and $P_3$ indicate the four corners of the screen. $A_{11}$ through $A_{55}$ indicate the adjustment reference points corresponding to the adjustment points. $S_x$ indicates the length of the screen in the horizontal direction and $S_y$ indicates the length of the screen in the vertical direction. Since the screen 4 is in a rectangular shape, the adjustment reference points $A_{11}$ through $A_{55}$ can be determined on the basis of the ends of the screen. In this embodiment, the positions of the screen corners $P_0$, $P_1$, $P_2$ and $P_3$ are inputted through the keyboard 15 by an operator, thereby determining the positions of the adjustment reference points $A_{11}$ through $A_{55}$ in a manner described in detail below.

The input procedure for the positions of the screen corners (step S210) will now be described in detail. In Embodiment 1, among positional information, information on a distance between the image correction apparatus 1 and the screen 4 is not required. Therefore, it is possible to indicate the position of an optional point on the screen 4 with two independent parameters. As the two parameters indicating the position of a point on the screen 4, for example, the angles of the stepping motors 6 and 7 can be used. In this embodiment, the position of an optional point is indicated by the angles of the stepping motors 6 and 7. For example, when the angles of the stepping motors 6 and 7 at the time when the camera 8 picks up part of the screen so that a point P is positioned at the center of the coordinate on the frame memory 11 (this state is defined as that the camera 8 faces the point P) are assumed to be $\theta_p$ and $\phi_p$, respectively, the position of the point P is indicated as $(\theta_p, \phi_p)$.

Through the operation of the keyboard 15, the CPU 12 gives an instruction to the motor controller 9, thereby respectively rotating the stepping motors 6 and 7 in the instructed directions so as to change the covering range (pick-up position) of the camera 8. The video signal picked up by the camera 8 is converted into a video data by the A/D converter 10, and stored on the frame memory 11. The video data on the frame memory 11 is converted into a video signal by the monitor circuit 13 so as to be displayed on the monitor 14. When the screen corner $P_0$ ($\theta_{p0}$, $\phi_{p0}$) is picked up as the point P, the keyboard 15 is operated to move the pick-up position, while monitoring with the monitor 14, so that the screen corner $P_0$ is positioned at the center of the monitor 14. When the CPU 12 is instructed through the keyboard operation that the corner $P_0$ is picked up, the CPU 12 stores the angles ($\theta_{p0}$, $\phi_{p0}$) of the stepping motors 6 and 7 as the pick-up positions. Similarly, the positions of the screen corners $P_1$, $P_2$ and $P_3$ are inputted through the operation of the keyboard 15, and the angles ($\theta_1$, $\phi_1$), ($\theta_2$, $\phi_2$) and ($\theta_3$, $\phi_3$) of the stepping motors 6 and 7 are stored in the CPU 12.

Figure 5:
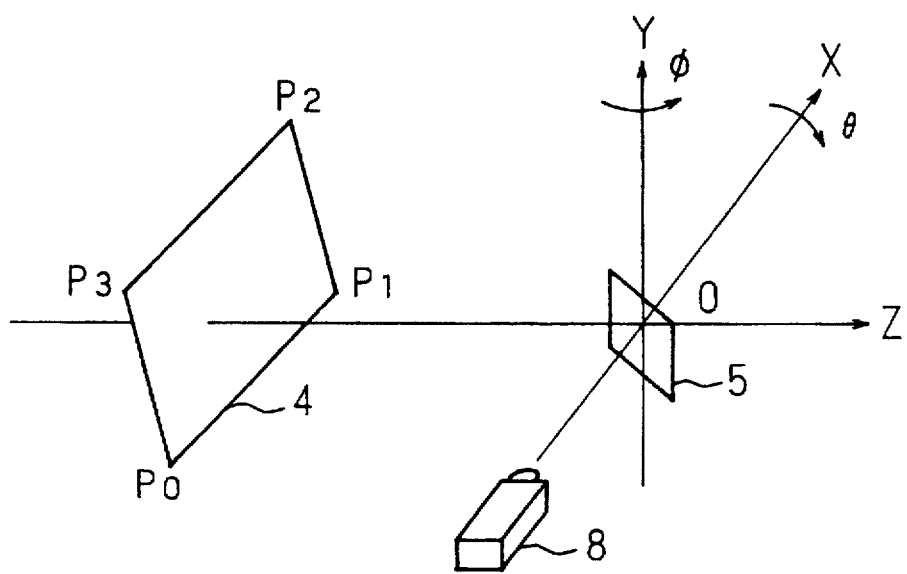
FIG. 5 is an explanatory view showing definition of a coordinate system of Embodiment 1.

Description will now be made of the detailed procedures for calculating the positions of the adjustment reference points (step S220) after the pick-up positions of the four screen corners are thus supplied to the image correction apparatus 1. FIG. 5 shows the positional relationship among the screen 4, the mirror 5 and the camera 8 in this embodiment, in which a three dimensional coordinate space is defined as follows: The position of the mirror 5 is defined as the origin O, through which both the rotation axes of the mirror 5 extend. The angles $\theta$ and $\phi$ of the stepping motors 6 and 7 at the time when the mirror 5 is parallel to the screen 4 are defined as zero. The z-axis is defined as the direction of a normal vector of the mirror 5 at the time when the angles $\theta$ and $\phi$ of the stepping motors 6 and 7 are zero, and the direction from the origin O toward the screen 4 is defined as the negative direction of the Z-axis. The direction from the origin O toward the camera 8 is defined as the negative direction of the X-axis. At this point, the rotation axis of the stepping motor 6 always accords with the X-axis. The direction of the rotation axis of the stepping motor 7 depends upon the angle $\theta$ of the stepping motor 6, and accords with the Y-axis when the angle $\theta$ is zero. When the angles of the stepping motors 6 and 7 are ($\theta$, $\phi$) the direction of the normal vector of the mirror 5 is identical to that of a vector obtained by rotating a unit vector (0, 0, -1) in the negative direction of the Z-axis by the angle $\phi$ with the Y-axis as a center and with the direction of the right-handed screw as positive, and then rotating the obtained vector by the angle $\theta$ with the x-axis as a center and with the direction of the right-handed screw as positive.

Next, a relational expression between a direction vector ($x_k$, $y_k$, $z_k$) from an optional point K on the screen 4 with the origin O as its starting point and the angles ($\theta_k$, $\phi_k$) of the stepping motors 6 and 7 for allowing the camera 8 to face the point K will be described. When the angles ($\theta_k$, $\phi_k$) are known, the direction vector ($x_k$, $y_k$, $z_k$) can be obtained by the following expressions 1 through 3. When the direction vector ($x_k$, $y_k$, $z_k$) is known, the angles ($\theta_k$, $\phi_k$) can be obtained by the following expressions 4 and 5.

$$x_k = \cos 2\phi_k \quad (1)$$

$$y_k = \sin \theta_k \cdot \sin 2\phi_k \quad (2)$$

$$z_k = -\cos \theta_k \cdot \sin 2\phi_k \quad (3)$$

$$\theta_k = \cos^{-1}(z_k/(y_k^2+z_k^2)^{(1/2)}) \quad (4)$$

$$\phi_k = \tfrac{1}{2}\cos^{-1}(x_k/(x_k^2+y_k^2+z_k^2)^{(1/2)}) \quad (5)$$

Figure 6:
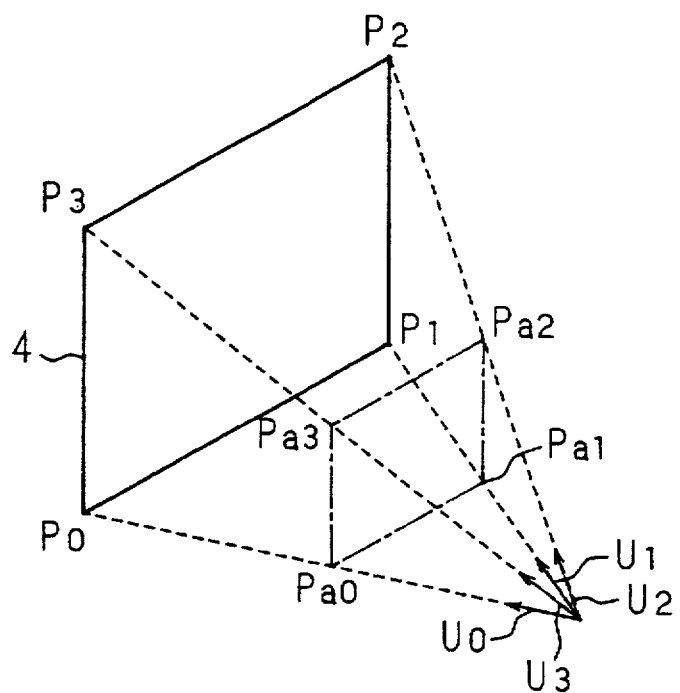
FIG. 6 is an explanatory view showing a method of determining a reference point in Embodiment 1.
Figure 7:
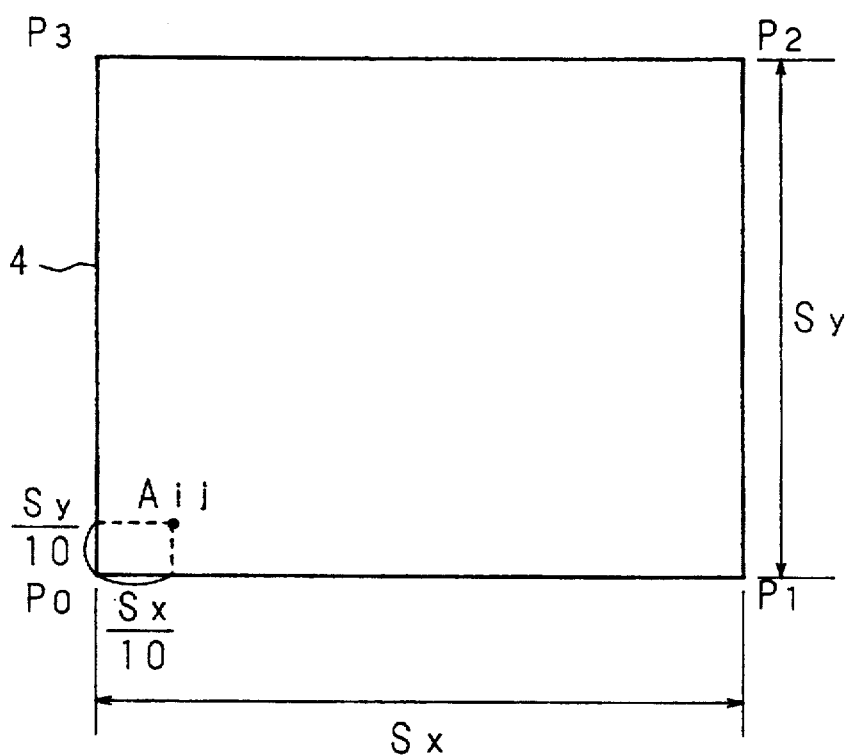
FIG. 7 is a view showing the position of a reference point $A_{11}$ in Embodiment 1.

Next, a method of obtaining the positions ($\theta_{A11}$, $\phi_{A11}$) through ($\theta_{A55}$, $\phi_{A55}$) of the adjustment reference points $A_{11}$ through $A_{55}$ based on the positions of the screen corners $P_0$ through $P_3$ will be described. FIG. 6 is a view explaining the method for determining the positions of the adjustment reference points in this embodiment, wherein the corners $P_0$ through $P_3$ and their direction vectors with the origin O as their starting point are shown. In FIG. 6, $U_0$, $U_1$, $U_2$ and $U_3$ indicates unit vectors from the screen corners $P_0$, $P_1$, $P_2$ and $P_3$, respectively, with the origin O as their starting point.

At first, in expressions 1 through 3, ($\theta_k$, $\phi_k$) is substituted with ($\theta_0$, $\phi_0$), thereby obtaining the unit vector $U_0=(U_{0x}, U_{0y}, U_{0z})$ for allowing the camera 8 to face the screen corner $P_0$. Similarly, the unit vectors $U_1=(U_{1x}, U_{1y}, U_{1z})$, $U_2=(U_{2x}, U_{2y}, U_{2z})$ and $U_3=(U_{3x}, U_{3y}, U_{3z})$ for allowing the camera 8 to face the screen corners $P_1$, $P_2$ and $P_3$, respectively, are obtained based on the angles ($\theta_1$, $\phi_1$), ($\theta_2$, $\phi_2$) and ($\theta_3$, $\phi_3$).

A point $P_{a0}$ ($P_{a0x}$, $P_{a0y}$, $P_{a0z}$) shown in FIG. 6 indicates a point having the common direction vector $U_0$ with the screen corner $P_0$. Specifically, the point $P_{a0}$ is positioned on a line extending between the screen corner $P_0$ and the origin O, and the angles of the stepping motors 6 and 7 for allowing the camera 8 to face the point $P_{a0}$ is identical to the angles of the stepping motors 6 and 7 for allowing the camera 8 to face the screen corner $P_0$. Similarly, points $P_{a1}=(P_{a1x}, P_{a1y}, P_{a1z})$, $P_{a2}=(P_{a2x}, P_{a2y}, P_{a2z})$, and $P_{a3}=(P_{a3x}, P_{a3y}, P_{a3z})$ are points having the common unit vectors $U_1$, $U_2$ and $U_3$ with the screen corners $P_1$, $P_2$ and $P_3$, respectively.

At this stage, the coordinates of the points $P_{a0}$, $P_{a1}$, $P_{a2}$ and $P_{a3}$ are calculated based on the vectors $U_0$, $U_1$, $U_2$ and $U_3$, so as to satisfy the following condition 1:

Condition 1: The points $P_{a0}$, $P_{a1}$, $P_{a2}$ and $P_{a3}$ are positioned on the same plane and together form a rectangular. A plane $P_{a0}P_{a1}P_{a2}P_{a3}$ takes the shape of a parallelogram.

There exist a countless number of solutions that satisfy the condition 1, but the solution can be uniquely defined by appropriately determining, for example, the position of the point $P_{a0z}$. With regard to each component of the points $P_{a0}$, $P_{a1}$, $P_{a2}$ and $P_{a3}$ and the vectors $U_0$, $U_1$, $U_2$ and $U_3$, the following expressions 6 through 13 hold:

$$P_{a0x}=P_{a0z} \cdot U_{0x}/U_{0z} \quad (6)$$

$$P_{a0y}=P_{a0z} \cdot U_{0y}/U_{0z} \quad (7)$$

$$P_{a1x}=P_{a1z} \cdot U_{1x}/U_{1z} \quad (8)$$

$$P_{a1y}=P_{a1z} \cdot U_{1y}/U_{1z} \quad (9)$$

$$P_{a2x}=P_{a2z} \cdot U_{2x}/U_{2z} \quad (10)$$

$$P_{a2y}=P_{a2z} \cdot U_{2y}/U_{2z} \quad (11)$$

$$P_{a3x}=P_{a3z} \cdot U_{3x}/U_{3z} \quad (12)$$

$$P_{a3y}=P_{a3z} \cdot U_{3y}/U_{3z} \quad (13)$$

When the point $P_{a0z}$ is appropriately defined at this stage, the points $P_{a1z}$, $P_{a2z}$ and $P_{a3z}$ are solutions of the following linear equations 14 through 16:

$$P_{a1z} \cdot U_{1x}/U_{1z} - P_{a2z} \cdot U_{2x}/U_{2z} + P_{a3z} \cdot U_{3x}/U_{3z} = P_{a0z} \cdot U_{0x}/U_{0z} \quad (14)$$

$$P_{a1z} \cdot U_{1y}/U_{1z} - P_{a2z} \cdot U_{2y}/U_{2z} + P_{a3z} \cdot U_{3y}/U_{3z} = P_{a0z} \cdot U_{0y}/U_{0z} \quad (15)$$

$$P_{a1z} - P_{a2z} + P_{a3z} = P_{a0z} \quad (16)$$

Then, $P_{a0z}$, $P_{a1z}$, $P_{a2z}$ and $P_{a3z}$ obtained through expressions 14 through 16 are substituted in expressions 6 through 13, thereby obtaining $P_{a0x}$, $P_{a1x}$, $P_{a2x}$, $P_{a3x}$, $P_{a0y}$, $P_{a1y}$, $P_{a2y}$ and $P_{a3y}$. In this manner, the coordinates of the points $P_{a0}$, $P_{a1}$, $P_{a2}$ and $P_{a3}$ satisfying the condition 1 are obtained.

The plane including the thus obtained points $P_{a0}$, $P_{a1}$, $P_{a2}$ and $P_{a3}$ is parallel to the screen. The position of an adjustment reference point $A_{ij}$ on the screen can be represented by the following expression 17 by using constants $a_0$ through $a_3$ and the points $P_0$ through $P_3$:

$$OA_{ij}=a_0 \cdot OP_0 + a_1 \cdot OP_1 + a_2 \cdot OP_2 + a_3 \cdot OP_3 \quad (17)$$

For example, in Embodiment 1, 5×5 adjustment reference points are provided on the screen 4. When the reference point $A_{11}$ is positioned at a point away from the point $P_0$ by $S_x/10$ in the x direction and by $S_y/10$ in the y direction, the following expression 18 holds:

$$OA_{11}=\frac{1}{10}(OP_3 - OP_0) + \frac{1}{10}(OP_1 - OP_0) = -\frac{1}{5} \cdot OP_0 + \frac{1}{10} \cdot OP_1 + \frac{1}{10} \cdot OP_3 \quad (18)$$

This results in $a_0=-\frac{1}{5}$, $a_1=\frac{1}{10}$, $a_2=0$, $a_3=\frac{1}{10}$. The other adjustment reference points $A_{12}$ through $A_{55}$ can be similarly represented.

Figure 8:
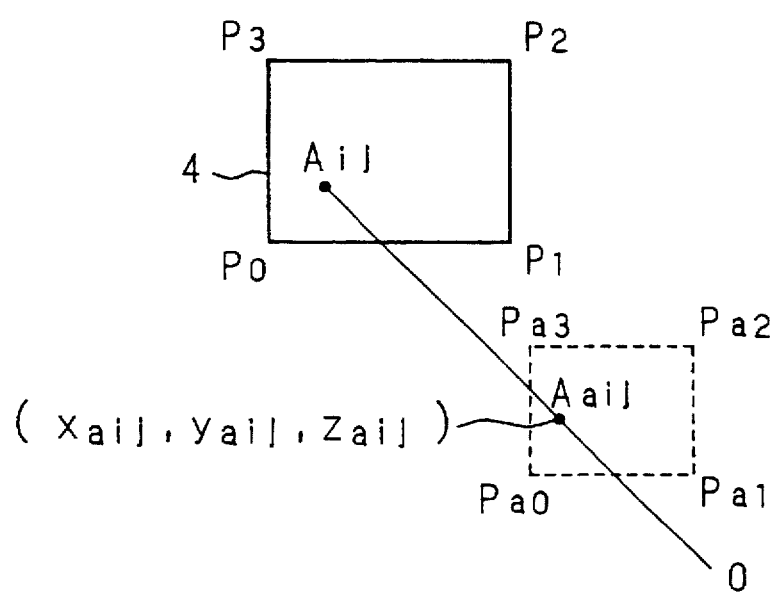
FIG. 8 is an explanatory view showing a calculation method for the coordinate of a reference point in Embodiment 1.
Figure 9A:
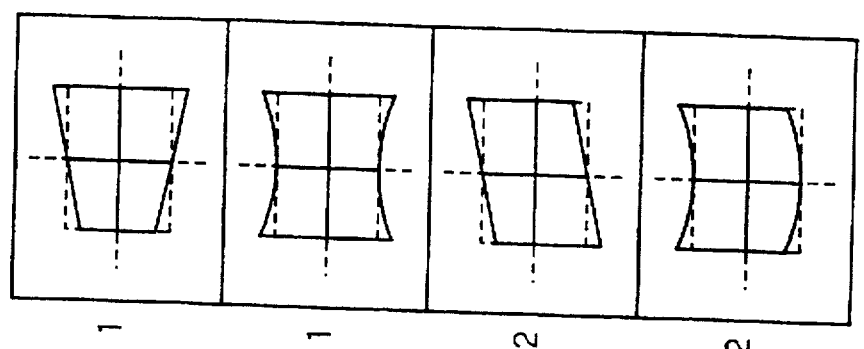
FIG. 9 is a view showing fundamental wave components of a correction function for raster distortion and convergence dislocation.
Figure 9B:
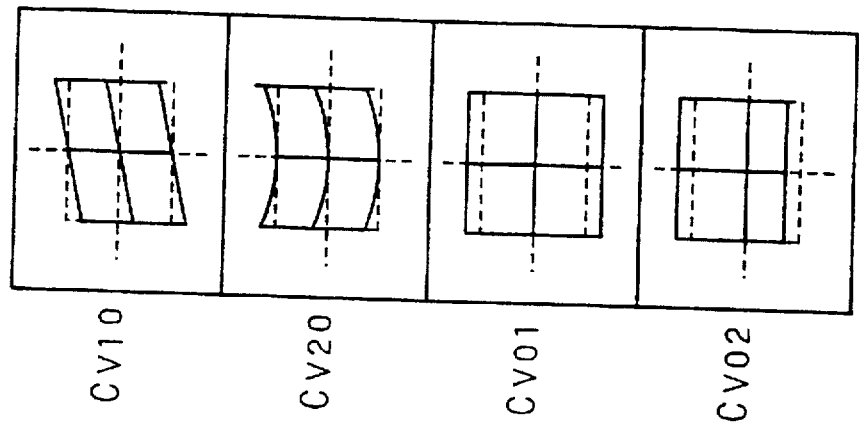
Figure 9C:
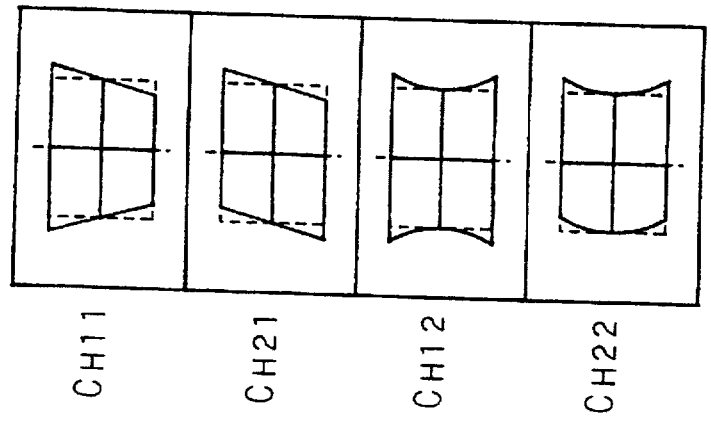
Figure 9D:
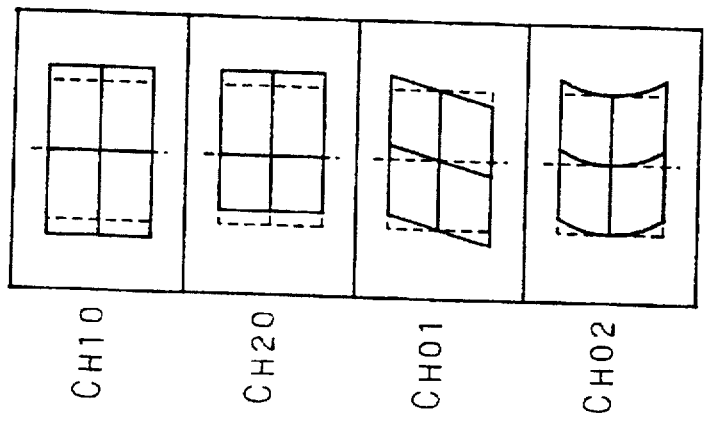

At this point, when a point $A_{aij}$ is defined to be positioned on a line $OA_{ij}$ on the plane $P_{a0}P_{a1}P_{a2}P_{a3}$ as is shown in FIG. 8, since the plane $P_{a0}P_{a1}P_{a2}P_{a3}$ is parallel to the screen, the following expression 19 holds:

$$OA_{aij}=a_0 \cdot OP_{a0} + a_1 \cdot OP_{a1} + a_2 \cdot OP_{a2} + a_3 \cdot OP_{a3} \quad (19)$$

When $OA_{aij}$ is represented by using the components as $(x_{aij}, y_{aij}, z_{aij})$, $(x_{aij}, y_{aij}, z_{aij})$ can be obtained by substituting $OP_{a0}$, $OP_{a1}$, $OP_{a2}$ and $OP_{a3}$ with $(P_{a0x}, P_{a0y}, P_{a0z})$, $(P_{a1x}, P_{a1y}, P_{a1z})$, $(P_{a2x}, P_{a2y}, P_{a2z})$ and $(P_{a3x}, P_{a3y}, P_{a3z})$, respectively in expression 16. Furthermore, based on the obtained $(x_{aij}, y_{aij}, z_{aij})$, the angles $(\theta_{aij}, \phi_{aij})$ can be obtained by using expressions 4 and 5.

In this manner, the angles of the stepping motors 6 and 7 for allowing the camera 8 to face the adjustment reference points $A_{11}$ through $A_{55}$ on the screen 4 can be respectively determined.

Next, the detailed procedures for moving the pick-up position (step S230) will be described. At first, one of the adjustment reference points, for example, the reference point $A_{11}$ is picked up. The CPU 12 sends an instruction to the motor controller 9 so that the stepping motors 6 and 7 are set at the angles for allowing the camera 8 to face the point $A_{11}$ obtained in step S220. Thus, the objective adjustment reference point is positioned at the center of the covering range of the camera 8.

Now, the detailed procedures for detecting a difference D between an adjustment point and a corresponding adjustment reference point (step S240) will be described. The CPU 12 sends an instruction to make the CRT projector 2 project an adjustment pattern of a G signal through the interface circuit 3. At this point, the CRT projector 2 projects the adjustment pattern onto the screen 4 by using a built-in character. A video signal picked up by the camera 8 is converted into a digital data by the A/D converter 10, which is then stored on the frame memory 11. The CPU 12 computes, for example, the center of gravity of the data stored on the frame memory 11, thereby obtaining the coordinate of an adjustment point on the adjustment pattern. A difference D between an adjustment reference point and a corresponding adjustment point can be obtained by calculating differences in the X components and Y components between the coordinate of the center of the frame memory 11 (i.e., the reference point) and the coordinate of the adjustment point (calculated value). The difference D calculated in this manner is stored in the memory of the CPU 12.

When the detection of the difference D related to one adjustment point is completed, the CPU 12 sends another instruction to the motor controller 9, so that the camera 8 can pick up a subsequent adjustment reference point, thereby similarly detecting a difference D related to the subsequent adjustment reference point. In this manner, the differences D related to all of the adjustment reference points are detected. Based on the detected differences, an extent of raster distortion is detected.

By using the detected extent of the raster distortion, the correction of the raster distortion in the CRT projector 2 is performed, for example, as follows: In step S250, a convergence current to be allowed to flow through a convergence coil of the CRT projector 2 in order to eliminate the differences D is calculated as a correction function based on the detected differences D related to all of the adjustment points. When a correction function of a horizontal convergence coil is assumed to be $F_H(x, y)$, and a correction function of a vertical convergence coil is assumed to be $F_V(x, y)$, the correction functions are represented by, for example, the following expressions 20 and 21:

$$F_H(x, y) = C_{H00} + C_{H10} x + C_{H01} y + C_{H20} x^2 + C_{H02} y^2 + C_{H11} xy + C_{H21} x^2y + C_{H12} xy^2 + C_{H22} x^2y^2 \quad (20)$$

$$F_V(x, y) = C_{V00} + C_{V10} x + C_{V01} y + C_{V20} x^2 + C_{V02} y^2 + C_{V11} xy + C_{V21} x^2y + C_{V12} xy^2 + C_{V22} x^2y^2 \quad (21)$$

In the above expressions, coefficients $C_{H00}$ and $C_{V00}$ depend upon static convergence dislocation, and coefficients $C_{H10}$ through $C_{H22}$ and $C_{V10}$ through $C_{V22}$ respectively correspond to distortion components shown in FIG. 9. These coefficients are obtained through calculation (step S260), and the coefficient data are transferred to the CRT projector 2 through the interface circuit 3 (step S270). The CRT projector 2 controls a convergence current for the convergence yoke for a G signal by using a built-in convergence circuit based on the received coefficient data, thereby making the adjustment points accord with the corresponding adjustment reference points (step S280). In this manner, the raster distortion is corrected.

Now, the procedures for convergence adjustment of this embodiment will be described. At first, similarly to the correction of raster distortion, one of the adjustment reference points, for example, the point $A_{11}$ is picked up. The CPU 12 sends an instruction through the interface circuit 3 to the CRT projector 2 so as to project an adjustment pattern for a G signal. The camera 8 picks up the adjustment pattern for a G signal, the obtained video signal is A/D converted by the A/D converter 10 and the obtained video data is stored on the frame memory 11. The CPU 12 processes the video data on the frame memory 11 (for example, calculates the center of gravity), thereby calculating the coordinates of the adjustment points on the pattern for a G signal. Next, the CPU 12 sends another instruction to the CRT projector 2 to project an adjustment pattern for an R signal. The camera 8 picks up the adjustment pattern for an R signal, the obtained video signal is A/D converted by the A/D converter 10, and the obtained video data is stored on the frame memory 11. The video data on the frame memory 11 is processed by the CPU 12 similarly to that for a G signal, thereby calculating the coordinates of the adjustment points on the pattern for an R signal. The CPU 12 then calculates differences in the X components and the Y components between the coordinates of the adjustment points for a G signal and those for an R signal, and the differences are stored in the work memory in the CPU 12. Similarly, differences $D_G$ in the coordinates between all the adjustment points for a G signal and those for an R signal are calculated.

After calculating the differences $D_G$ related to all the adjustment points in this manner, the CPU 12 calculates coefficients of horizontal and vertical convergence correction functions for an R signal based on the differences $D_G$, and transfers the coefficients to the CRT projector 2 through the interface circuit 3. The CRT projector 2 controls a convergence current for the convergence yoke for an R signal by the built-in convergence circuit, thereby making the adjustment points for an R signal accord with those for a G signal. The convergence adjustment for an R signal is thus completed. Then, the convergence adjustment for a B signal is similarly conducted. In this manner, the convergence adjustment can be performed by using the same system used for the correction of raster distortion.

Figure 10:
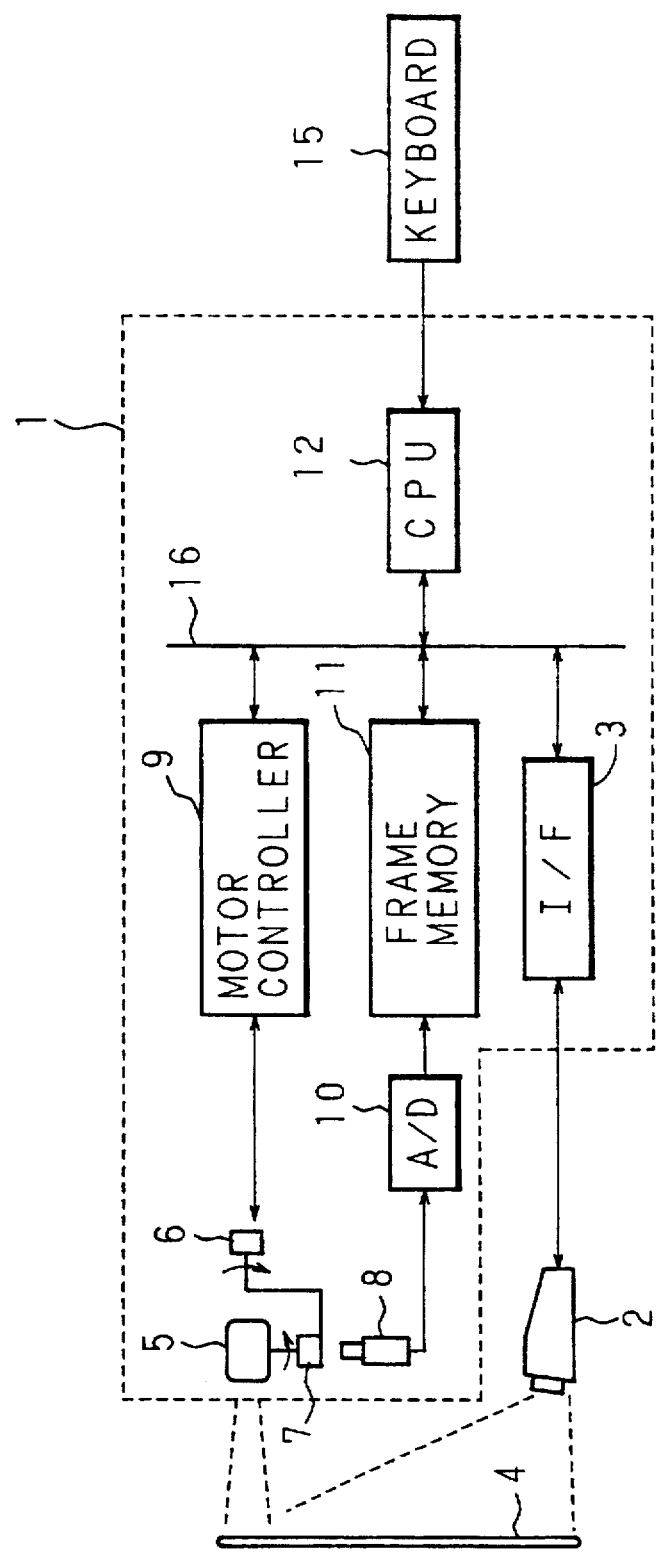
FIG. 10 is a block diagram showing a configuration of an image correction apparatus according to Embodiment 2 of the invention.
Figure 11:
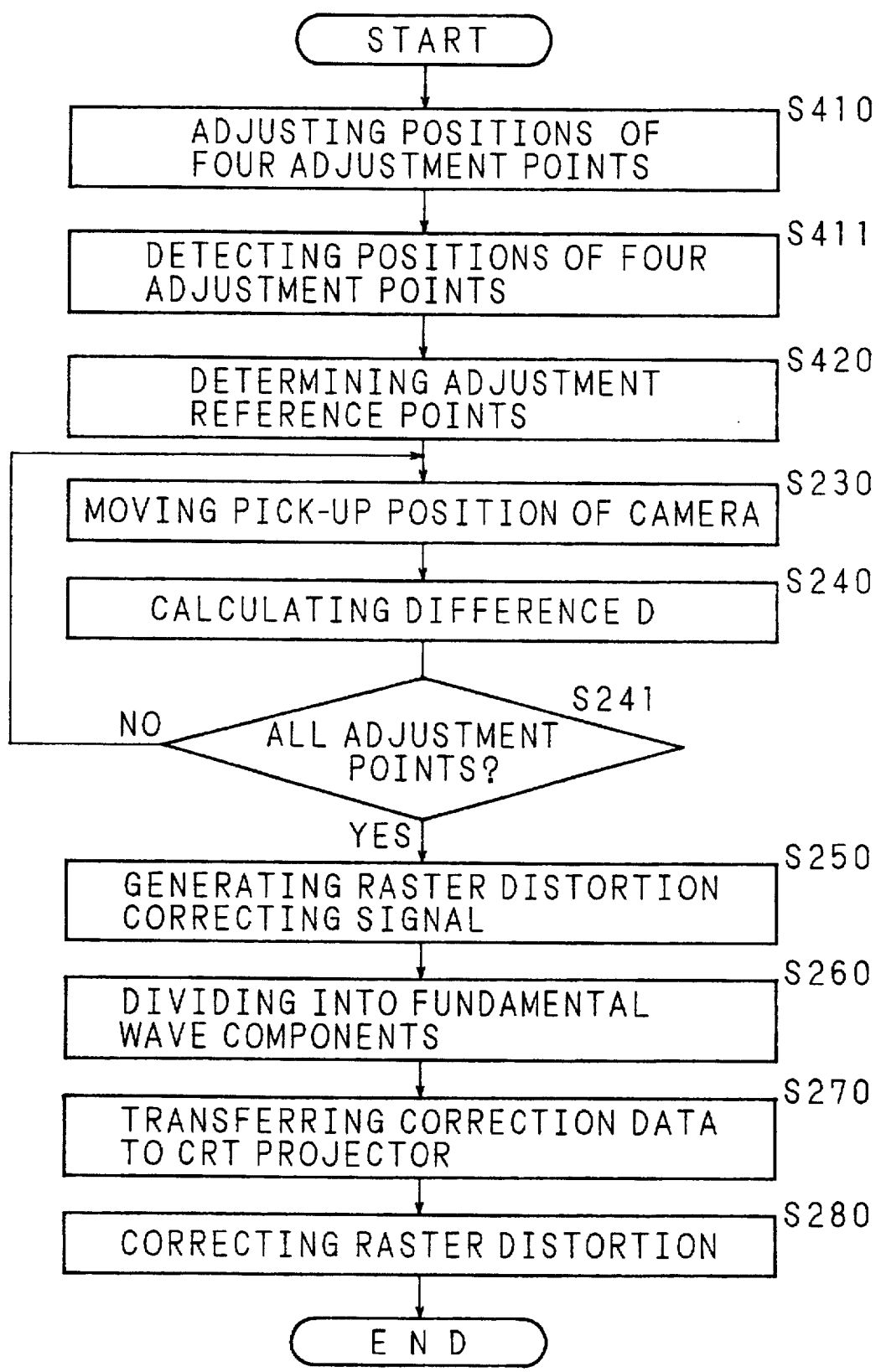
FIG. 11 is a flowchart for the procedures in raster distortion correction of Embodiment 2.

Embodiment 2:

In Embodiment 1, a monitor is used in order to input the positions of the four screen corners, but it is possible to input the positions of the four screen corners without using a monitor. A configuration to enable this will now be described as Embodiment 2. FIG. 10 is a block diagram showing the configuration of an image correction apparatus of Embodiment 2, which will not be described in detail because it is identical to that of Embodiment 1 except that the monitor is not used. FIG. 11 is a flowchart for the procedures in the correction of raster distortion is performed in accordance with Embodiment 2.

With regard to m×n adjustment points in the screen area, the positions of the adjustment points are adjusted through the keyboard 15 so that four adjustment points corresponding to the four screen corners form a rectangular (step S410). In the following description, the adjustment performed by using 5×5 adjustment reference points as is shown in FIG. 4 will be exemplified. The adjustment method will be described referring to FIG. 12. Adjustment patterns corresponding to the four screen corners, i.e., adjustment reference points $A_{11}$, $A_{15}$, $A_{51}$ and $A_{55}$ in FIG. 4, are projected on the screen 4 by the CRT projector 2. The left-hand portion of FIG. 12 shows the state of the screen 4 before the adjustment, wherein points $B_{11}$, $B_{15}$, $B_{51}$ and $B_{55}$ are projection points of the adjustment patterns corresponding to the adjustment reference points $A_{11}$, $A_{15}$, $A_{51}$ and $A_{55}$, respectively. The positions of the adjustment patterns are moved through the keyboard 15 so that the points $B_{11}$, $B_{15}$, $B_{51}$ and $B_{55}$ together form a rectangular. Thus, the four adjustment points corresponding to the screen corners form a rectangular. The right-hand portion of FIG. 12 shows the state of the screen 4 after this adjustment.

Next, the positions of the four adjustment points which have been adjusted in step S410 are detected (step S411). The covering range of the camera 8 is moved so that one of the adjustment patterns projected on the screen 4, for example, the pattern $B_{11}$, is picked up by the camera 8. The camera 8 picks up the adjustment pattern $B_{11}$, and the obtained video signal is A/D converted to be stored on the frame memory 11. The coordinate of the adjustment pattern $B_{11}$ on the frame memory 11 is calculated through the calculation of the center of gravity by the CPU 12. It is herein assumed that the calculated coordinate is ($F_{B11x}$, $F_{B11y}$) and the angles of the stepping motors 6 and 7 at this point are $\theta_{B11a}$ and $\phi_{B11a}$. The coordinate ($F_{B11x}$, $F_{B11y}$) is not necessarily positioned at the center of the detection frame of the camera 8. When the angles of the stepping motors 6 and 7 for allowing the camera 8 to face the adjustment pattern $B_{11}$ is assumed to be ($\theta_{B11}$, $\phi_{B11}$), the angles $\theta_{B11}$ and $\phi_{B11}$ do not generally accord with the angles $\theta_{B11a}$ and $\phi_{B11a}$. Therefore, the angles ($\theta_{B11}$, $\phi_{B11}$) for allowing the camera 8 to face the adjustment pattern $B_{11}$ are calculated as follows:

At first, after the stepping motor 6 is rotated from the angle $\theta_{B11a}$ by a unit angle, the camera 8 picks up the adjustment pattern $B_{11}$ on the screen 4 again, and the obtained video signal is A/D converted and stored on the frame memory 11. The CPU 12 calculates the center of gravity of the data on the frame memory 11, thereby calculating the coordinate of the adjustment pattern $B_{11}$ on the frame memory 11. The calculated coordinate at this point is assumed to be ($F1_{B11x}$, $F1_{B11y}$). Through the comparison between ($F1_{B11x}$, $F1_{B11y}$) and ($F_{B11x}$, $F_{B11y}$), the relationship between the rotation of the stepping motor 6 by a unit angle and the positional change of the image on the frame memory can be obtained. Then, the stepping motor 7 is rotated from $\phi_{B11a}$ by a unit angle, the adjustment pattern $B_{11}$ on the screen 4 is picked up by the camera 8 again, and the video signal is A/D converted to be stored on the frame memory 11. The CPU 12 calculates the center of gravity of the data on the frame memory 11, thereby calculating the coordinate of the adjustment pattern $B_{11}$ on the frame memory 11. The calculated coordinate at this point is assumed to be ($F2_{B11x}$, $F2_{B11y}$). Through the comparison between ($F2_{B11x}$, $F2_{B11y}$) and ($F1_{B11x}$, $F1_{B11y}$), the relationship between the rotation of the stepping motor 7 by a unit angle and the positional change of the image on the frame memory can be obtained. On the basis of the thus obtained relationship, the angles of the stepping motors 6 and 7 for locating the adjustment pattern $B_{11}$ at the center of the coordinate on the frame memory 11, i.e., the angles ($\theta_{B11}$, $\phi_{B11}$) of the stepping motors 6 and 7 for allowing the camera 8 to face the adjustment pattern $B_{11}$, are calculated.

The angles ($\theta_{B11}$, $\phi_{B11}$) of the stepping motors 6 and 7 calculated as above are stored in the work memory in the CPU 12. Similarly, the adjustment patterns $B_{15}$, $B_{51}$ and $B_{55}$ are respectively picked up to obtain the angles ($\theta_{B15}$, $\phi_{B15}$), ($\theta_{B51}$, $\phi_{B51}$) and ($\theta_{B55}$, $\phi_{B55}$) of the stepping motors 6 and 7 related to the respective adjustment patterns.

In step S420, based on the angles ($\theta_{B11}$, $\phi_{B11}$), ($\theta_{B15}$, $\phi_{B15}$), ($\theta_{B51}$, $\phi_{B51}$) and ($\theta_{B55}$, $\phi_{B55}$) of the stepping motors 6 and 7 for allowing the camera 8 to face the four corner adjustment points, the angles of the stepping motors 6 and 7 for allowing the camera 8 to face all of the adjustment reference points are calculated. By replacing ($\theta_0$, $\phi_0$), ($\theta_1$, $\phi_1$), ($\theta_2$, $\phi_2$) and ($\theta_3$, $\phi_3$) used in step S220 of Embodiment 1 with ($\theta_{B11}$, $\phi_{B11}$), ($\theta_{B15}$, $\phi_{B15}$) ($\theta_{B51}$, $\phi_{B51}$) and ($\theta_{B55}$, $\phi_{B55}$), the angles of the stepping motors 6 and 7 for allowing the camera 8 to face the respective adjustment reference points can be calculated in the similar manner to that of Embodiment 1. The process to be performed thereafter is identical to that of Embodiment 1. Thus, raster distortion can be corrected and convergence can be adjusted automatically without using a monitor.

Figure 13:
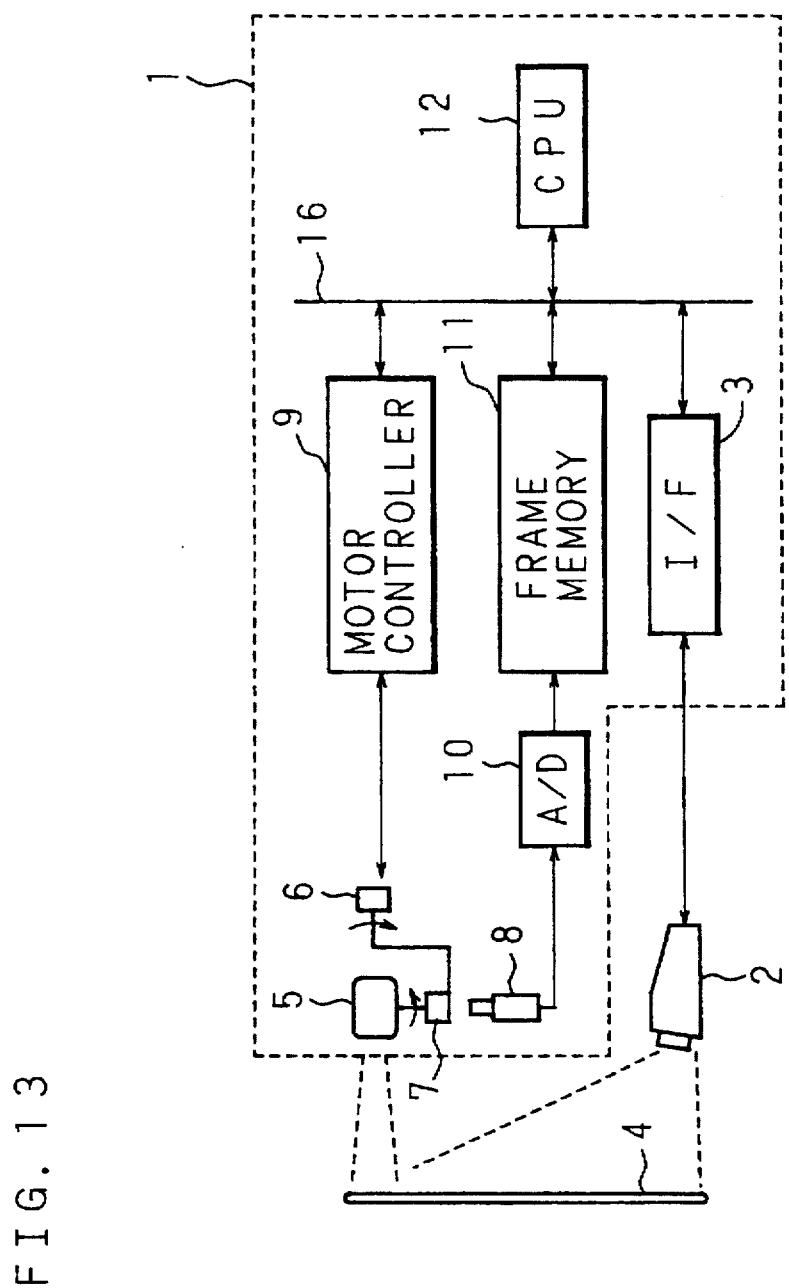
FIG. 13 is a block diagram showing a configuration of an image correction apparatus according to Embodiment 3 of the invention.
Figure 14:
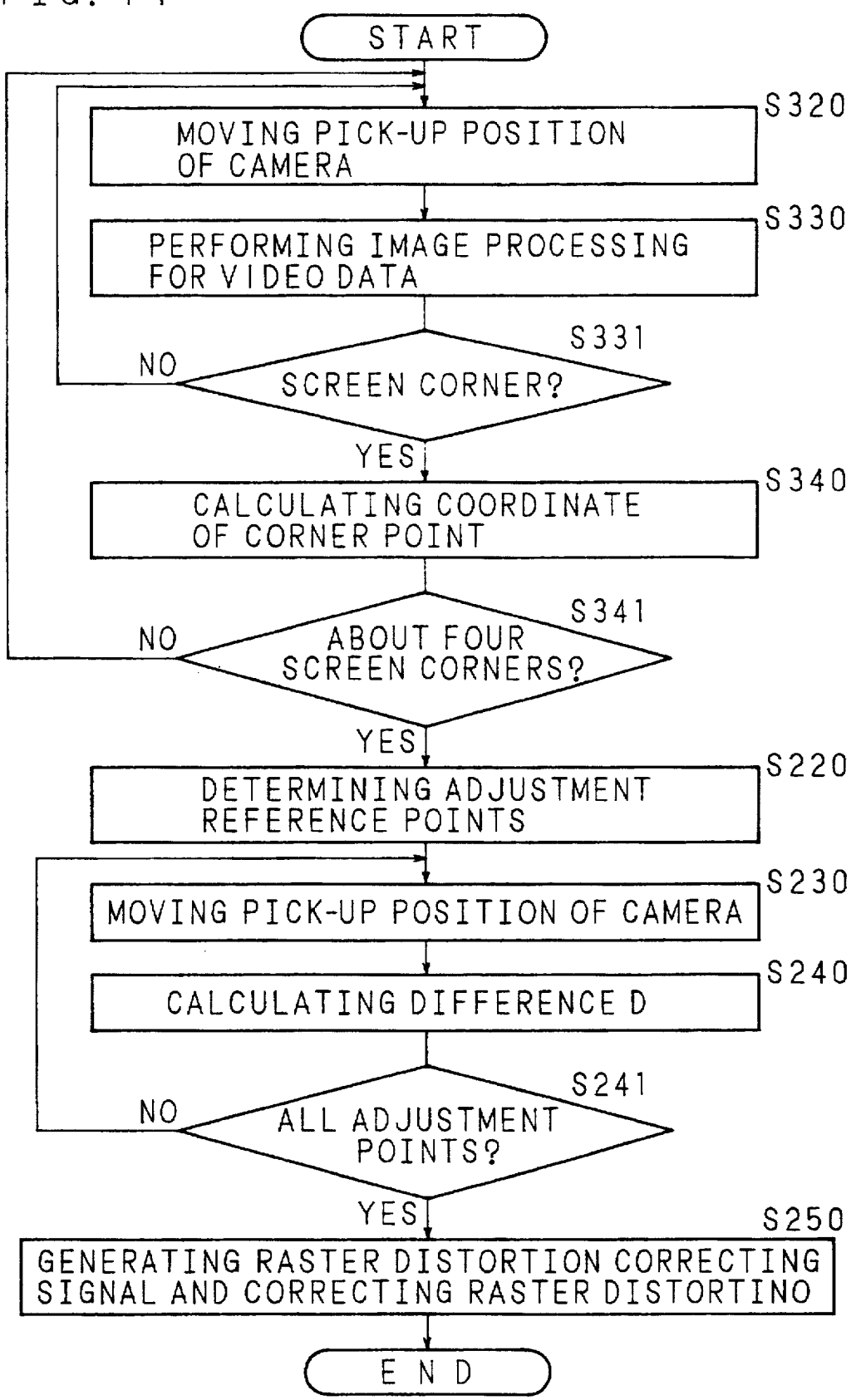
FIG. 14 is a flowchart for procedures in raster distortion correction of Embodiment 3.

Embodiment 3:

In the aforementioned embodiments, the positions of the screen corners or the positions of the corner adjustment points in the adjustment patterns are inputted through the keyboard, but such information can be automatically detected. A configuration to enable this is embodied as follows:

FIG. 13 is a block diagram showing the configuration of an image correction apparatus according to Embodiment 3, which will not be described in detail because it is identical to that of Embodiment 2 except that the keyboard is not used. FIG. 14 is a flowchart for the procedures in correction of raster distortion in Embodiment 3.

The pick-up position of the camera 8 is moved so as to pick up one of the corners of the screen 4 (step S320). Specifically, the pick-up position is moved from the initial position toward the point $P_0$ (see FIG. 4), that is, one of the screen corners. It is herein assumed that the strict positional relationship between the screen 4 and the image correction apparatus 1 in the initial state is unknown, and that the image correction apparatus 1 is installed so that the camera 8 picks up a portion around the center of the screen 4. The CPU 12 sends an instruction to the motor controller 9 to move the pick-up position of the camera 8 by a predetermined distance toward a line $P_0P_1$, positioned at the bottom of the screen 4. Then, the video signal picked up by the camera 8 is A/D converted by the A/D converter 10, and the obtained video data is stored on the frame memory 11. The CPU 12 performs image processing described below on the video data on the frame memory 11 (step S330), and determines whether or not the bottom of the screen (i.e., the line $P_0P_1$) is included in the picked up image. When the bottom of the screen is not included, the pick-up position of the camera 8 is moved further downward.

Next, the pick-up position of the camera 8 is moved leftward, i.e., toward the point $P_0$, along the line $P_0P_1$ at the bottom of the screen. Then, it is determined whether or not another screen end, i.e., the left end of the screen (line $P_0P_3$), is included in the picked up image. When it is not included, the pick-up position of the camera 8 is moved further leftward. When the left end of the screen is included in the picked up image, the screen corner $P_0$ is within the covering range of the camera 8. The procedures in steps S320 and S330 are repeated until the screen corner $P_0$ is picked up, and when the screen corner $P_0$ is detected, the procedure proceeds to the subsequent step. The screen corners are detected, for example, in the order of $P_0$, $P_1$, $P_2$ and $P_3$ shown in FIG. 4.

Next, the coordinate of the picked up corner point is calculated in a manner described below, and the angles of the stepping motors 6 and 7 for allowing the camera to face the screen corner are calculated (step S340). The procedures from step S320 to step S340 are repeated until the angles of the stepping motors 6 and 7 for allowing the camera 8 to face the four screen corners are calculated, and the calculation of the angles related to all the screen corners is completed, the procedure proceeds to the subsequent step. The processes performed thereafter (i.e., the procedures from step S220 on) are identical to those described in Embodiment 1.

Figure 15:
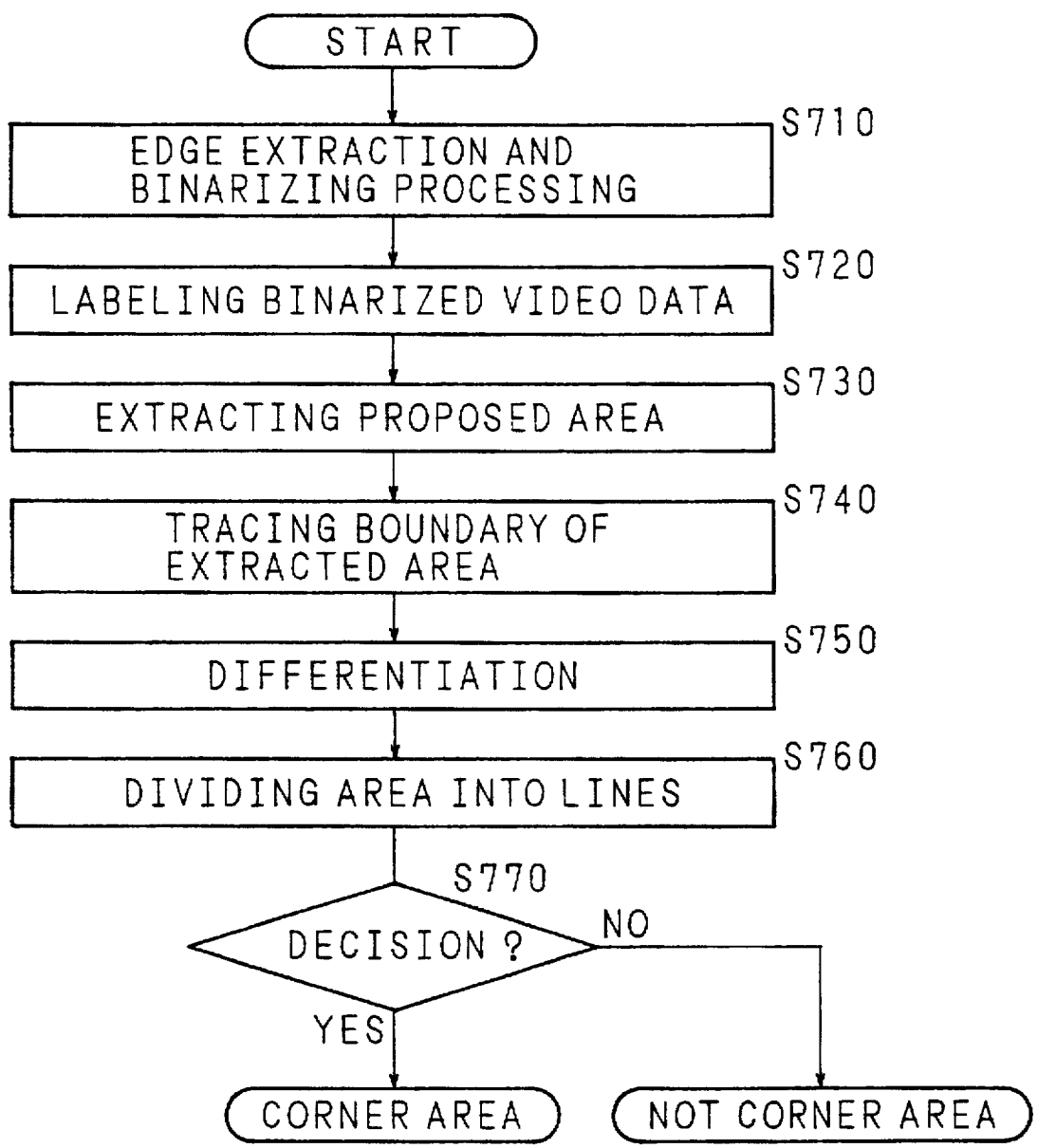
FIG. 15 is a flowchart for procedures in detection of a screen corner in Embodiment 3.
Figure 16A:
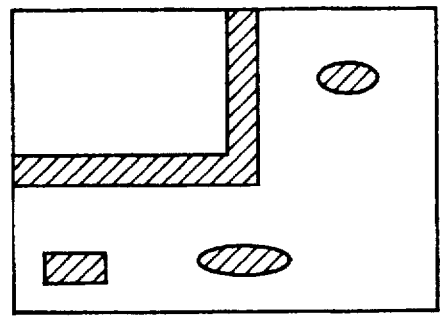
FIG. 16A is a schematic diagram showing a binarized video signal in Embodiment 3.
Figure 16A:
Figure 16B:
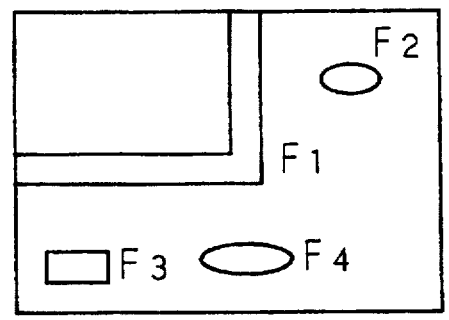
FIG. 16B is a schematic diagram showing a result of labeling the binarized video data in FIG. 16A.
Figure 16C:
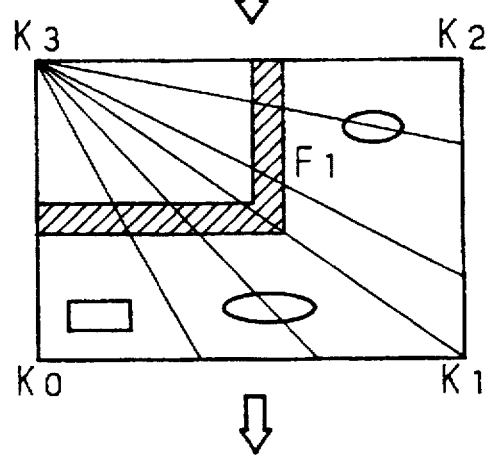
FIG. 16C is a schematic diagram explaining the detection of an area adjacent to the center of FIG. 16B.
Figure 16C:
Figure 16D:
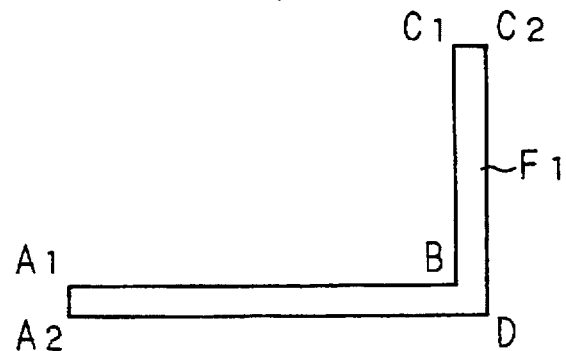
FIG. 16D is a schematic diagram showing a proposed area of FIG. 16C.

Now, the image processing method for the video data in step S330 will be described referring to a flowchart for the procedures in detecting the presence of a screen corner shown in FIG. 15 and a schematic diagram of an image picked up by the camera 8 shown in FIGS. 16A, 16B, 16C and 16D. The video data stored on the frame memory 11 as a digital data is subjected to edge extraction, and subsequently to binarizing processing using a given threshold value (step S710). The video data after the edge extraction and the binarizing processing is exemplified in a schematic diagram of FIG. 16A. In FIG. 16A, hatched portions correspond to portions having a brightness value of 1 after the binarizing processing, and the remaining portion corresponds to a portion having a brightness value of 0 after the binarizing processing.

The binarized video data is then subjected to labeling, thereby being divided into areas each having the same binary value (step S720). The labeled video data is exemplified in FIG. 16, wherein four areas $F_1$, $F_2$, $F_3$ and $F_4$ are obtained.

An area that is closest to the center of the screen is extracted as a proposed area for a screen corner (step S730). Since the rough direction of the center of the screen is known, a plurality of lines radially extending from a corner which is the nearest to the center of the screen among the four corners $K_0$ through $K_3$ of the labeled video data (i.e., the point $K_3$ in FIG. 16C) are assumed, and the areas are searched along these lines. The reference numeral of an area that is first found along each line is recorded. When the reference numerals of the areas found along the respective lines are all identical, that area is selected as the proposed area. When all the reference numerals are not identical, one of the areas is selected as the proposed area through majority logic. In the case shown in FIG. 16C, the hatched area $F_1$ is selected as the proposed area. Among the video data on the frame memory 11, the proposed area $F_1$ alone is taken out and shown in FIG. 16D.

Figure 17:
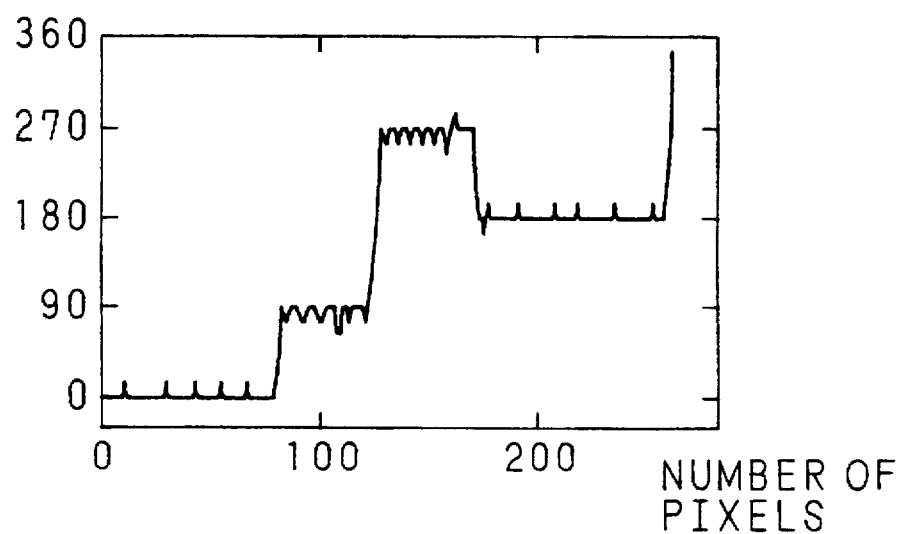
FIG. 17 is a diagram showing the relationship between the number of pixels and angles in the screen corner detection process of Embodiment 3.

In order to obtain information on lines forming the area, the boundary of the extracted area $F_1$ is tranced (step S740). At first, one point at the edge of the area $F_1$ is selected as a starting point. For example, in the case shown in FIG. 16D, a point $A_1$ is selected as a starting point. Then, the boundary between this area and the non-extracted area is traced from the starting point, so as to trace every aimed point pixel by pixel. In the case shown in FIG. 16D, the trace starts from the starting point $A_1$ and proceeds to B, $C_1$, $C_2$, D and $A_2$ in this order. During the trace, an angle of a line extending between a currently aimed point and a previously aimed point is recorded. Thus, this procedure is repeated until the boundary is traced back to the starting point $A_1$. Based on the number of the traced pixels and the angles, the information on the lines forming the area can be obtained. FIG. 17 is an example of a graph showing the relationship between the number of traced pixels and the angles. In FIG. 17, the axis of abscissa indicates the number of the pixels, and the axis of ordinates indicates the angles, defining angles in a counterclockwise manner by assuming the positive direction of the X-axis on the frame memory 11 to be 0 degree.

Figure 18:
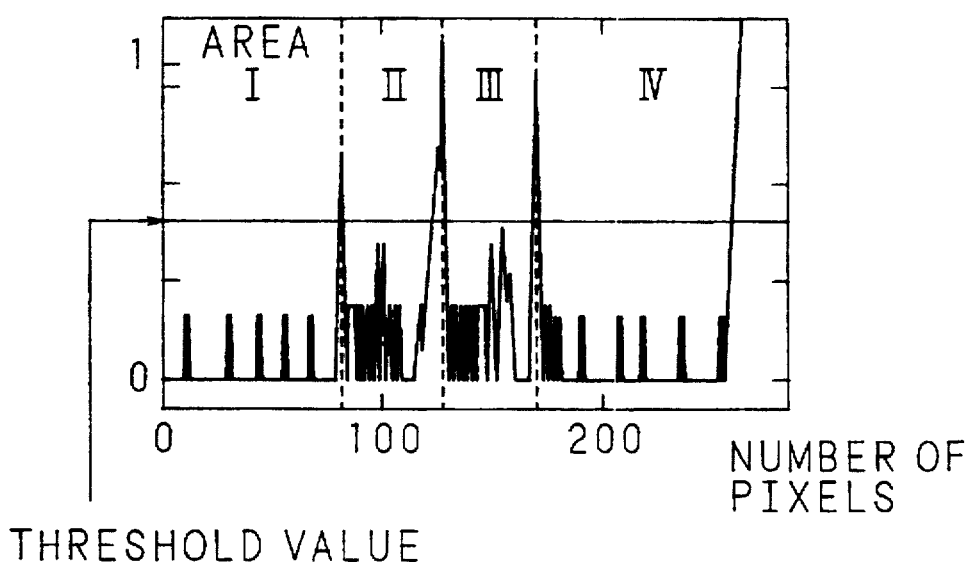
FIG. 18 is a diagram showing a relationship between the number of the pixels and differentiation of the angles in the screen corner detection process of Embodiment 3.

In order to take out the lines forming the area, with regard to the data of the relationship between the number of the pixels and the angles obtained in step S740 (as shown in FIG. 17), the angles are differentiated with the number of pixels (step S750). Through this differentiation, data as is shown in FIG. 18 can be obtained. In FIG. 18, the axis of abscissa indicates the number of the pixels and the axis of ordinate indicates the differentiated values of the angles, which are normalized with the maximum value to be 1. In step S760, the area is divided into lines based on the differentiation information. In FIG. 18, a portion below a given threshold value correspond to a part having little variation in angle. Therefore, the lines can be obtained by extracting a portion below the given threshold value. In the case shown in FIG. 18, four areas I, II, III and IV are obtained as the lines.

Then, the rough shape of the area can be determined by obtaining the lengths of the lines and the angles between the adjacent lines. When the rough shape of the area and the lines forming the area satisfy both corner detection conditions 1 and 2 described below, it is decided that the area is a corner area. In step S770, this decision is made, for example, under the following conditions:

Condition 1: The number of the lines is four.

Condition 2: The adjacent lines have substantially the same length.

Each screen corner area can be found in the above-mentioned manner.

Figure 19:
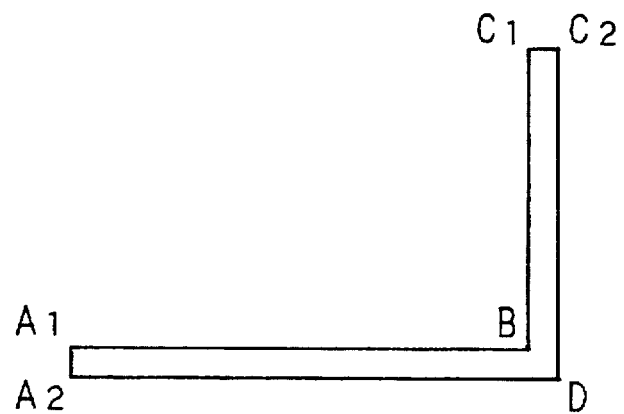
FIG. 19 is an explanatory view showing calculation of the coordinate of a screen corner of Embodiment 3.

Now, the method for calculating the coordinate of the screen corner used in step S340 will be described in detail. The coordinate of the screen corner on the frame memory is calculated at first. FIG. 19 shows a screen corner area in a picked up image, which is composed of four lines $A_1B$, $BC_1$, $C_2D$ and $DA_2$. For example, by assuming the point B at the crossing point of the lines $A_1B$ and $BC_1$ as a screen corner, the coordinate of the point B (=$P_0$) is calculated. The calculated coordinate on the frame memory 11 of the screen corner $P_0$ is herein assumed to be ($FP_{0x}$, $FP_{0y}$). This coordinate ($FP_{0x}$, $FP_{0y}$) and the angles ($\theta_{0a}$, $\phi_{0a}$) of the stepping motors 6 and 7 at the time of picking up the point $P_0$ by the camera 8 are stored in the work memory in the CPU 12. Thus, the first screen corner $P_0$ is detected.

Since the coordinate ($FP_{0x}$, $FP_{0y}$) is not necessarily positioned at the center of the detection frame of the camera 8, the angles ($\theta_{0a}$, $\phi_{0a}$) is not generally identical to the angles ($\theta_0$, $\phi_0$) of the stepping motors 6 and 7 for allowing the camera 8 to face the screen corner $P_0$. Therefore, the angles ($\theta_0$, $\phi_0$) of the stepping motors 6 and 7 for allowing the camera 8 to face the screen corner $P_0$ are calculated. In the same manner as described in step S411 of Embodiment 2, by measuring the variation of the coordinate from the coordinate ($FP_{0x}$, $FP_{0y}$) on the frame memory 11 of the screen corner $P_0$ caused when the stepping motors 6 and 7 are moved by a unit angle from the angles ($\theta_{0a}$, $\phi_{0a}$), the angles ($\theta_0$, $\phi_0$) of the stepping motors 6 and 7 for allowing the camera 8 to face the screen corner $P_0$ can be calculated. The calculated angles ($\theta_0$, $\phi_0$) are stored in the work memory in the CPU 12.

The screen corners $P_1$, $P_2$ and $P_3$ are similarly detected. In order to place the corner $P_1$ within the covering range of the camera 8, the pick-up position of the camera 8 is moved along the line $P_0P_1$ toward the screen corner $P_1$, i.e., rightward. Then, the same procedures as is conducted on the screen corner $P_0$ are repeated to calculate the angles ($\theta_1$, $\phi_1$) of the stepping motors 6 and 7 for allowing the camera 8 to face the screen corner $P_1$, which are stored in the work memory in the CPU 12. Similarly, the pick-up position of the camera 8 is moved along the line $P_1P_2$ to pick up the screen corner $P_2$. Then, the angles ($\theta_2$, $\phi_2$) of the stepping motors 6 and 7 for allowing the camera 8 to face the screen corner $P_2$ are calculated, which are stored in the work memory in the CPU 12. Furthermore, the pick-up position of the camera 8 is moved along the line $P_2P_3$ to pick up the screen corner $P_3$. The angles ($\theta_3$, $\phi_3$) of the stepping motors 6 and 7 for allowing the camera 8 to face the screen corner $P_3$ are calculated, which are stored in the work memory in the CPU 12. In this manner the screen corners $P_1$, $P_2$ and $P_3$ are detected.

By using the angles ($\theta_0$, $\phi_0$), ($\theta_1$, $\phi_1$), ($\theta_2$, $\phi_2$) and ($\theta_3$, $\phi_3$) of the stepping motors 6 and 7 for allowing the camera 8 to face the respective screen corners, the positions of adjustment reference points are determined in the same manner as in Embodiment 1 (step S220). By using these adjustment reference points, the processes from the step S230 on are conducted in the same manner as in Embodiment 1. In this manner, raster distortion can be corrected and convergence can be adjusted without inputting the positions of four points on the screen 4 by an operator.

In this embodiment, the positions of all the adjustment reference points are calculated by detecting the screen corners as described above, but this does not limit the method of determining the adjustment reference points. For example, the positions of all of the adjustment reference points can be calculated by picking up projected images of adjustment patterns by the camera 8 and conducting image processing on the obtained video signals as described in Embodiment 2.

Figure 20:
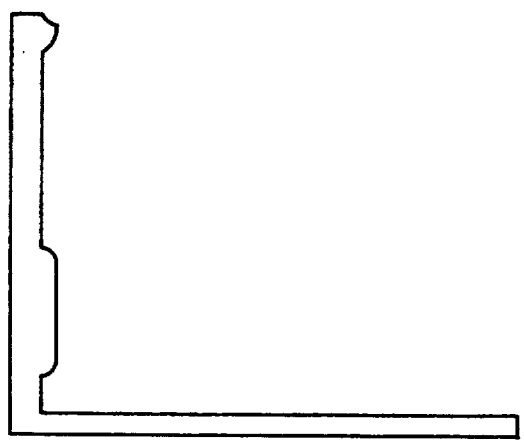
FIG. 20 is an explanatory view showing calculation of the coordinate of a deformed screen corner of Embodiment 3.
Figure 21:
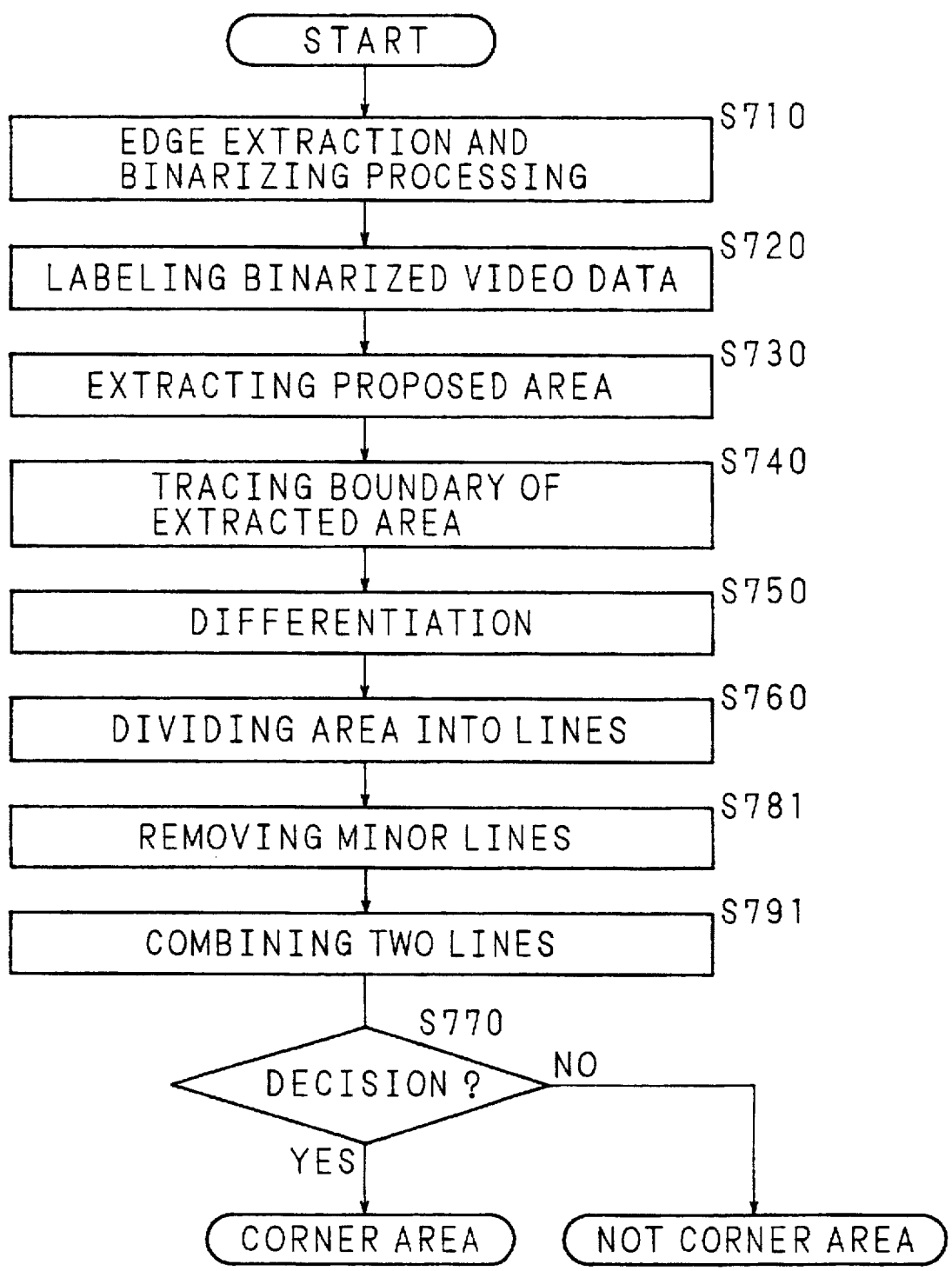
FIG. 21 is a flowchart for procedures in screen corner detection of Embodiment 4 of the invention.

Embodiment 4:

A corner area of a picked up image can take a shape as is shown in FIG. 20, depending upon the irradiation angle of light irradiating the screen when the image correction apparatus 1, the CRT projector 2 and the screen 4 are installed in a certain positional relationship. In this embodiment, it is so configured that a process to remove minor lines from a screen corner area in the video data is performed in order to accurately detect a screen corner deformed in this manner. FIG. 21 shows a flowchart for the detection of a screen corner according to this embodiment. The procedures from step S710 to step S760 are identical to those of Embodiment 3. As a pre-processing for the detection of a screen corner, minor lines are removed from the lines obtained by dividing the area (step S781). When the length of a line is smaller than a given threshold value, that area is removed. Then, angles of adjacent lines against a given reference line are compared with each other, and when the difference in the angle is smaller than a given threshold value, the two adjacent lines are combined to be regarded as one line (step S791). In step S770, decision is made similarly to Embodiment 3, and the processes thereafter are the same as those in Embodiment 3. Thus, it is possible to make such a decision on lines that are inherently one line but are divided by the effect of the irradiating light or the like. Even when a picked up image is unclear, a screen corner can be thus accurately detected.

Figure 22:
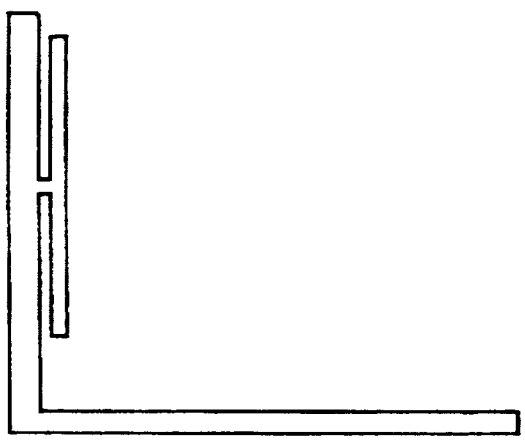
FIG. 22 is an explanatory view showing calculation of the coordinate of a deformed screen corner of Embodiment 4.
Figure 23:
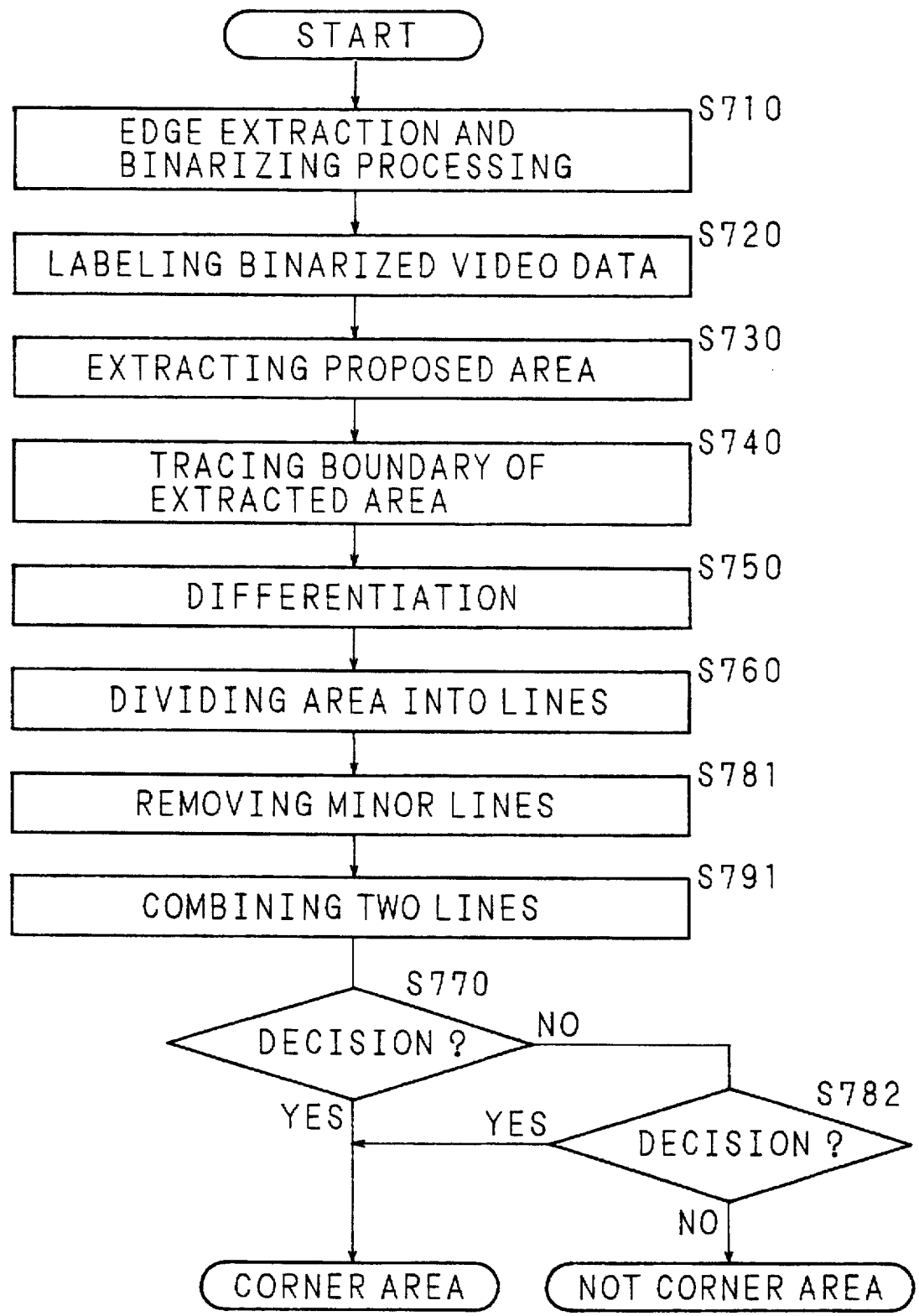
FIG. 23 is a flowchart for procedures in screen corner detection of Embodiment 5 of the invention.

Embodiment 5:

A proposed screen corner area in a video data of a picked up image can take a shape as shown in FIG. 22 because the corner area and another shaded area near the edge of the screen other than the corner area are combined with each other due to the positional relationship between lighting equipment and the screen. In this embodiment, an additional detection method for detecting a screen corner in such a case is proposed. FIG. 23 is a flowchart for the detection of a screen corner in this embodiment. The procedures from step S710 to step S770 (including steps S781 and S791) are same as those in Embodiment 4. When it is decided that there exists no screen corner in step S770, another detection is conducted in step S782. In step S782, both of the following conditions are satisfied, it is decided that the video data includes a screen corner.

Condition 3: The number of the lines obtained through the procedures up to step S791 is even.

Condition 4: There are an even number of pairs of lines adjacent to each other at an angle of approximately 180 degrees.

Thus, it is possible to detect a screen corner even in the case where a proposed screen corner area is in the shape as shown in FIG. 22. The processes thereafter are same as those in Embodiment 4. In this manner, even when a picked up image is unclear, a screen corner can be accurately detected.

As described above, according to the image correction apparatus of the invention, the extent of raster distortion and that of convergence displacement can be accurately detected in a short period of time by inputting the positions of four points on the screen by using a monitor by an operator. By using the detected extents of the raster distortion and convergence displacement, the raster distortion can be corrected and the convergence can be adjusted.

Alternatively, by instructing the positions of four points on an image without using a monitor by an operator, raster distortion can be corrected and convergence can be adjusted automatically with a simple apparatus.

Alternatively, it is also possible to correct raster distortion and to adjust convergence with ease and accurately without manual adjustment by an operator.

Furthermore, by removing minor lines from a detected image of a screen corner area, a screen corner can be accurately detected. In addition, when the detection of a screen corner area in a video data is conducted under two conditions, one of which is that the number of the lines is even, and the other of which is that there are an even number of pairs of lines adjacent to each other at an angle of approximately 180 degrees, a screen corner can be detected in various installation conditions without being affected by the positional relationship between lighting equipment and a screen.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bonds thereof are therefore intended to be embraced by the claims.

What is claimed is:

1. An image correction apparatus to be used together with a cathode ray tube system video projector (CRT projector), comprising:

camera means for picking up a screen on which an image is projected by said CRT projector;

pick-up position moving means for moving a pick-up position of said camera means;

movement controlling means for controlling drive of said pick-up position moving means;

instructing means for giving an instruction to said movement controlling means;

first memory means for storing said pick-up positions at which a plurality of points on said screen are respectively picked up in a predetermined area of a picture frame included in said camera means;

first calculating means for calculating positions of a predetermined number of adjustment reference points on said screen by using content of said first memory means;

analog/digital converting means (A/D converting means) for converting a video signal picked up by said camera means into a digital video data;

second memory means for storing the video data converted by said A/D converting means;

second calculating means for obtaining differences between positions of said adjustment reference points and positions of corresponding adjustment points on a predetermined image projected on said screen, by using content of said second memory means; and third calculating means for calculating an image distortion correction data based on the differences obtained by said second calculating means, wherein said instructing means gives an instruction to said movement controlling means based on a result obtained by said first calculating means, and said image distortion correction data is supplied to said CRT projector, so as to be used in distortion correction for an image projected by said CRT projector.

2. The image correction apparatus according to claim 1, further comprising:

input means for inputting content of the instruction to said instructing means; and a monitor for displaying the video signal picked up by said camera means, wherein said first memory means stores pick-up positions at which respective corners of said screen are picked up, and said pick-up positions are determined by using said monitor and said input means.

3. The image correction apparatus according to claim 2, wherein said second calculating means includes fourth calculating means for calculating positions of adjustment points on the predetermined image projected on said screen.

4. The image correction apparatus according to claim 3, further comprising:

fifth calculating means for obtaining second differences between positions of adjustment points of an image projected in one color and positions of corresponding adjustment points of the same image projected in another color, by using a result of calculation by said fourth calculating means; and sixth calculating means for calculating a convergence adjustment data based on said second differences, wherein said convergence adjustment data is supplied to said CRT projector, so as to be used in convergence adjustment of an image projected by said CRT projector.

5. The image correction apparatus according to claim 1, further comprising:

input means for inputting content of the instruction to said instructing means, wherein said first memory means stores pick-up positions at which a plurality among the adjustment points on the predetermined image projected on said screen by said CRT projector are respectively picked up, said plurality among the adjustment points are adjusted so as to form corners of a rectangle by said input means, and pick-up positions corresponding to said plurality of adjustment points are determined by using the video data of the predetermined image stored in said second memory means.

6. The image correction apparatus according to claim 5, wherein said second calculating means includes fourth calculating means for calculating positions of adjustment points on the predetermined image projected on said screen.

7. The image correction apparatus according to claim 6, further comprising:
fifth calculating means for obtaining second differences between positions of adjustment points of an image projected in one color and positions of corresponding adjustment points of the same image projected in another color, by using a result of calculation by said fourth calculating means; and
sixth calculating means for calculating a convergence adjustment data based on said second differences,
wherein said convergence adjustment data is supplied to said CRT projector, so as to be used in convergence adjustment of an image projected by said CRT projector.

8. The image correction apparatus according to claim 1, wherein said second calculating means includes fourth calculating means for calculating positions of adjustment points on the predetermined image projected on said screen.

9. The image correction apparatus according to claim 8, further comprising:
fifth calculating means for obtaining second differences between positions of adjustment points of an image projected in one color and positions of corresponding adjustment points of the same image projected in another color, by using a result of calculation by said fourth calculating means; and
sixth calculating means for calculating a convergence adjustment data based on said second differences,
wherein said convergence adjustment data is supplied to said CRT projector, so as to be used in convergence adjustment of an image projected by said CRT projector.

10. An image correction apparatus, to be used together with a cathode ray tube system video projector (CRT projector), comprising:
camera means for picking up a screen on which an image is projected by said CRT projector;
pick-up position moving means for moving a pick-up position of said camera means;
movement controlling means for controlling drive of said pick-up position moving means;
instructing means for giving an instruction to said movement controlling means;
first memory means for storing said pick-up positions at which a plurality of points on said screen are respectively picked up in a predetermined area of a picture frame included in said camera means;
first calculating means for calculating positions of a predetermined number of adjustment reference points on said screen by using content of said first memory means;
analog/digital converting means (A/D converting means) for converting a video signal picked up by said camera means into a digital video data;

second memory means for storing the video data converted by said A/D converting means;
decision means for deciding whether or not said camera means picks up a corner of said screen by using the video data stored in said second memory means;
second calculating means for obtaining differences between positions of said adjustment reference points and positions of corresponding adjustment points on a predetermined image projected on said screen, by using content of said second memory means; and
third calculating means for calculating an image distortion correction data based on the differences obtained by said second calculating means,
wherein said instructing means gives an instruction to said movement controlling means based on a result obtained by said first calculating means,
said image distortion correction data is supplied to said CRT projector, so as to be used in distortion correction for an image projected by said CRT projector,
wherein said first memory means stores pick-up positions at which the corners of said screen are picked up, and the pick-up positions are determined by using the video data stored in said second memory means when said decision means decides that the corners are picked up.

11. The image correction apparatus according to claim 10, wherein said second calculating means includes fourth calculating means for calculating positions of adjustment points on the predetermined image projected on said screen.

12. The image correction apparatus according to claim 11, further comprising:
fifth calculating means for obtaining second differences between positions of adjustment points of an image projected in one color and potions of corresponding adjustment points of the same image projected in another color, by using a result of calculation by said fourth calculating means; and
sixth calculating means for calculating a convergence adjustment data based on said second differences,
wherein said convergence adjustment data is supplied to said CRT projector, so as to be used in convergence adjustment of an image projected by said CRT projector.

13. The image correction apparatus according to claim 10, wherein said decision means extracts a proposed area from the video data stored in said second memory means and removes an area smaller than a predetermined length, prior to detection of a screen corner.

14. The image correction apparatus according to claim 10, wherein said decision means extracts a proposed area from the video data stored in said second memory means and divides the proposed area into lines, and decides that a screen corner is picked up when the number of the lines is even and there are an even number of pairs of lines adjacent to each other at an angle of approximately 180 degrees.

15. An image correction method for correcting images displayed by a cathode ray tube system video projector (CRT projector), comprising the steps of:
picking up a screen on which an image is projected by said CRT projector with a camera;
moving a pick-up position of the camera;
controlling said moving step;
giving an instruction to said controlling step;

a first storing step for storing the pick-up positions at which a plurality of points on said screen are respectively picked up in a predetermined area of a picture frame included in the camera;

a first calculating step for calculating positions of a predetermined number of adjustment reference points on the screen by using content of said first storing step;

A/D converting a video signal picked up by the camera into a digital video data;

a second storing step for storing the video data converted by said A/D converting step;

a second calculating step for obtaining differences between positions of the adjustment reference points and positions of corresponding adjustment points on a predetermined image projected on said screen, by using content stored by said second storing step; and a third calculating step for calculating an image distortion correction data based on the differences obtained by said second calculating step, wherein said instructing step gives an instruction to said controlling step based on a result obtained by said first calculating step, and said image distortion correction data is supplied to the CRT projector, so as to be used in distortion correction for an image projected by the CRT projector.

16. The image correction method according to claim 15, further comprising the steps of:

inputting content of the instruction to said instructing step; and displaying the video signal picked up by the camera on a monitor, wherein said first storing step stores pick-up positions at which respective corners of the screen are picked up, and the pick-up positions are determined by using the monitor and said inputting step.

17. The image correction method according to claim 16, wherein said second calculating step includes fourth calculating step for calculating positions of adjustment points on the predetermined image projected on the screen.

18. The image correction method according to claim 17, further comprising the steps of:

fifth calculating step for obtaining second differences between positions of adjustment points of an image projected in one color and positions of corresponding adjustment points of the same image projected in another color, by using a result of calculation by said fourth calculating step; and sixth calculating step for calculating a convergence adjustment data based on the second differences, wherein the convergence adjustment data is supplied to the CRT projector, so as to be used in convergence adjustment of an image projected by the CRT projector.

19. The image correction method according to claim 15, further comprising the steps of:

inputting content of the instruction to said instructing step, wherein said first storing step stores pick-up positions at which a plurality among the adjustment points on the predetermined image projected on the screen by the CRT projector are respectively picked up, wherein the plurality among the adjustment points are adjusted so as to form corners of a rectangle by said inputting step, and pick-up positions corresponding to the plurality of adjustment points are determined by using the video data of the predetermined image stored by said second storing step.

20. The image correction method according to claim 19, wherein said second calculating step includes fourth calculating step for calculating positions of adjustment points on the predetermined image projected on the screen.

21. The image correction method according to claim 20, further comprising the steps of:

fifth calculating step for obtaining second differences between positions of adjustment points of an image projected in one color and positions of corresponding adjustment points of the same image projected in another color, by using a result of calculation by said fourth calculating step; and sixth calculating step for calculating a convergence adjustment data based on the second differences, wherein the convergence adjustment data is supplied to the CRT projector, so as to be used in convergence adjustment of an image projected by the CRT projector.

22. The image correction method according to claim 15, wherein said second calculating step includes fourth calculating step for calculating positions of adjustment points on the predetermined image projected on the screen.

23. The image correction method according to claim 22, further comprising the steps of:

fifth calculating step for obtaining second differences between positions of adjustment points of an image projected in one color and positions of corresponding adjustment points of the same image projected in another color, by using a result of calculation by said fourth calculating step; and sixth calculating step for calculating a convergence adjustment data based on the second differences, wherein the convergence adjustment data is supplied to the CRT projector, so as to be used in convergence adjustment of an image projected by the CRT projector.

24. An image correction method for correcting images displayed by a cathode ray tube system video projector (CRT projector), comprising the steps of:

picking up a screen on which an image is projected by said CRT projector with a camera;

moving a pick-up position of the camera;

controlling said moving step;

giving an instruction to said controlling step;

a first storing step for storing the pick-up positions at which a plurality of points on said screen are respectively picked up in a predetermined area of a picture frame included in the camera;

a first calculating step for calculating positions of a predetermined number of adjustment reference points on the screen by using content of said first storing step;

A/D converting a video signal picked up by the camera into a digital video data;

a second storing step for storing the video data converted by said A/D converting step;

deciding whether or not the camera picks up a corner of the screen by using the video data stored by said second storing step;

a second calculating step for obtaining differences between positions of said adjustment reference points and positions of corresponding adjustment points on a predetermined image projected on the screen, by using content stored by said second storing step; and a third calculating step for calculating an image distortion correction data based on the differences obtained by said second calculating step, wherein said instructing step gives an instruction to said controlling step based on a result obtained by said first calculating step, wherein the image distortion correction data is supplied to the CRT projector, so as to be used in distortion correction for an image projected by the CRT projector, wherein said first storing step stores pick-up positions at which the corners of the screen are picked up, and the pick-up positions are determined by using the video data stored by said second storing step when said decision step decides that the corners are picked up.

25. The image correction method according to claim 24, wherein said second calculating step includes fourth calculating step for calculating positions of adjustment points on the predetermined image projected on the screen.

26. The image correction method according to claim 25, further comprising the steps of:

fifth calculating step for obtaining second differences between positions of adjustment points of an image projected in one color and potions of corresponding adjustment points of the same image projected in another color, by using a result of calculation by said fourth calculating step; and sixth calculating step for calculating a convergence adjustment data based on the second differences, wherein the convergence adjustment data is supplied to the CRT projector, so as to be used in convergence adjustment of an image projected by the CRT projector.

27. The image correction method according to claim 24, wherein said decision step extracts a proposed area from the video data stored by said second storing step and removes an area smaller than a predetermined length prior to detection of a screen corner.

28. The image correction method according to claim 24, wherein said decision step extracts a proposed area from the video data stored by said second storing step and divides the proposed area into lines, and decides that a screen corner is picked up when the number of the lines is even and there are an even number of pairs of lines adjacent to each other at an angle of approximately 180 degrees.

* * * * *